May 6, 1952        H. T. AVERY        2,595,504
MEANS FOR PRODUCING THRUST
Filed May 28, 1943        12 Sheets-Sheet 1
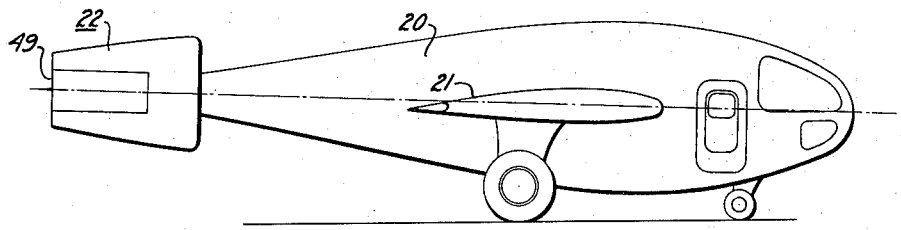
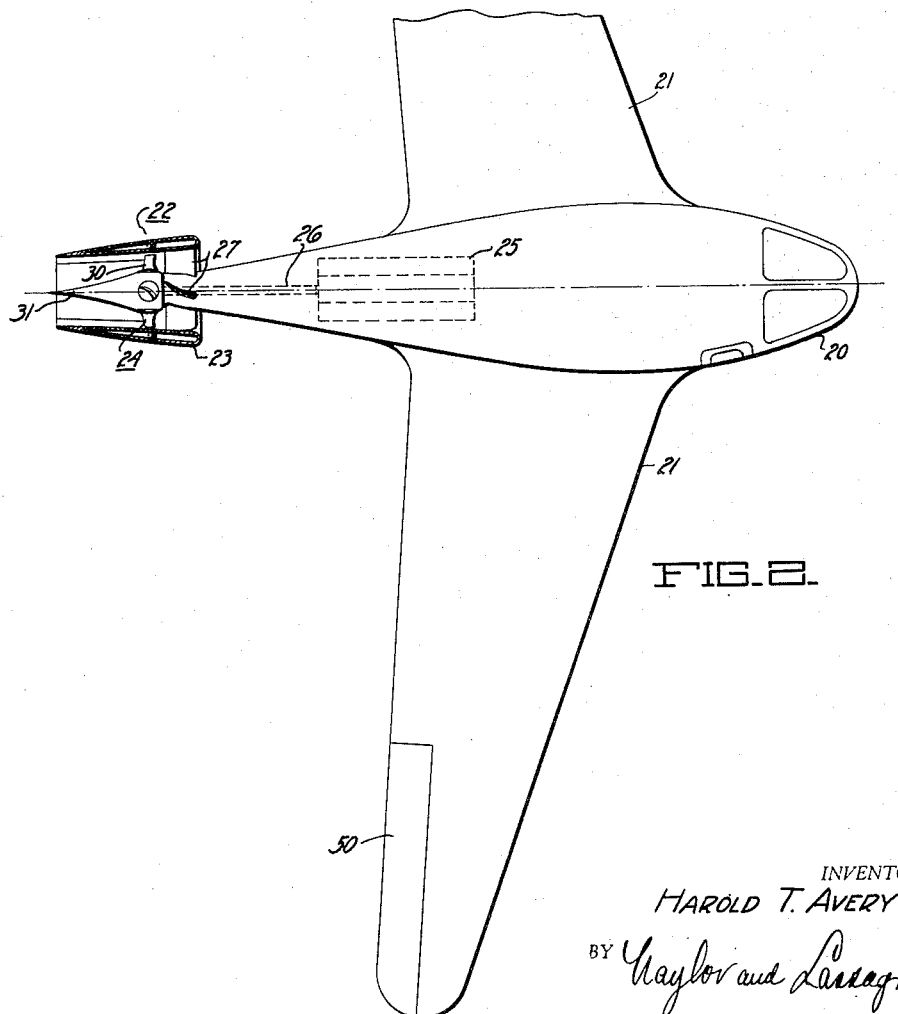
INVENTOR.
HAROLD T. AVERY
BY Naylor and Lassagne
ATTORNEYS

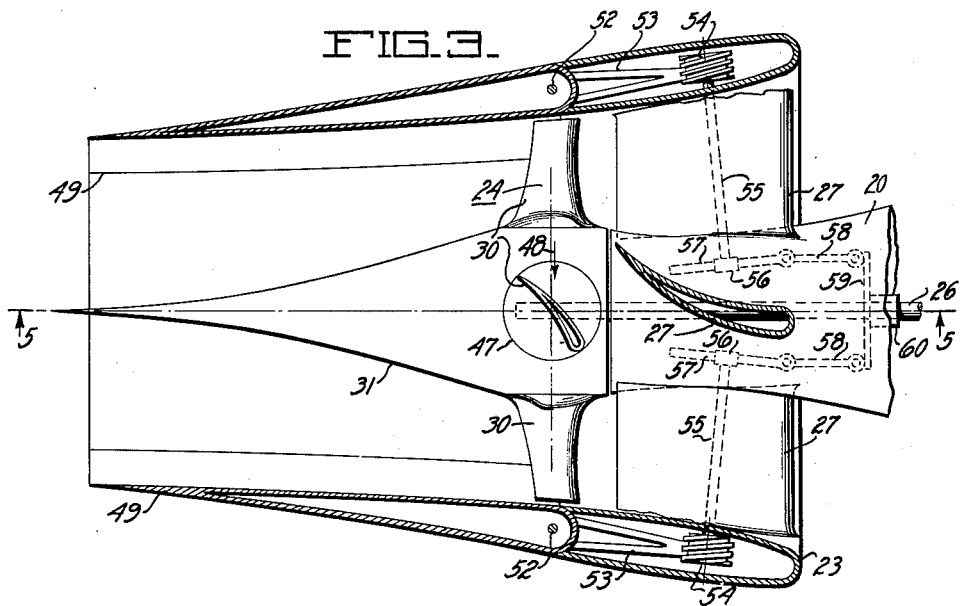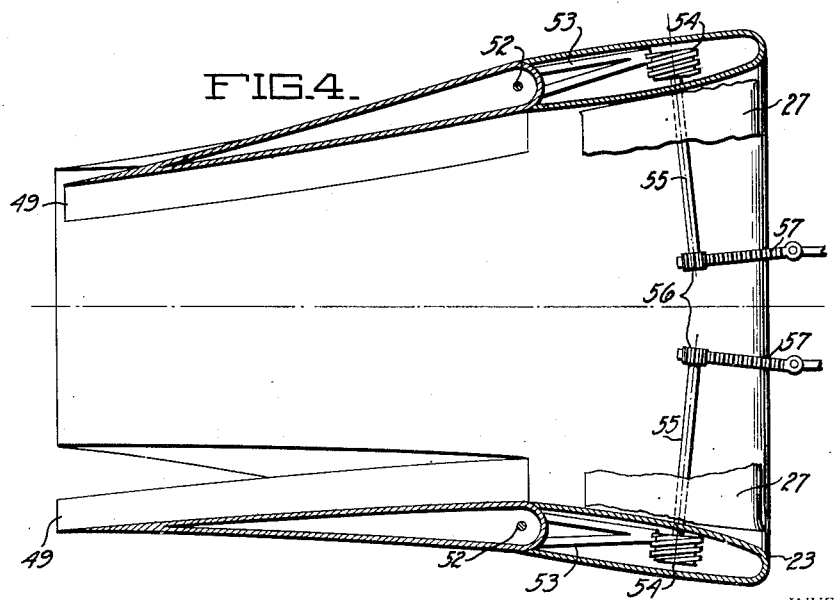

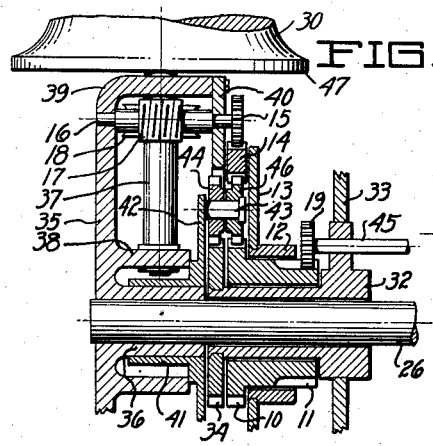

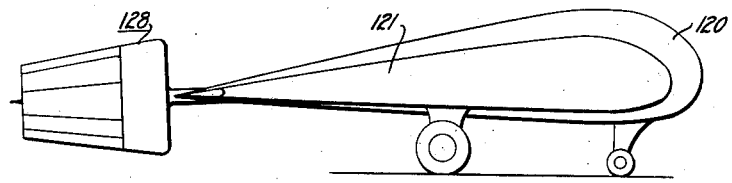
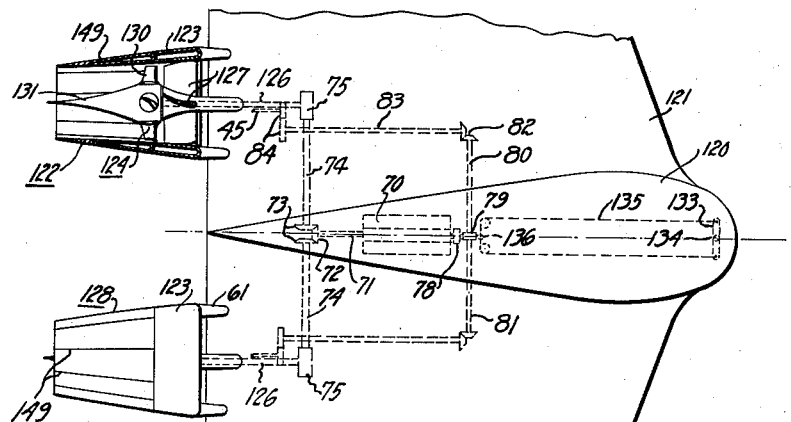

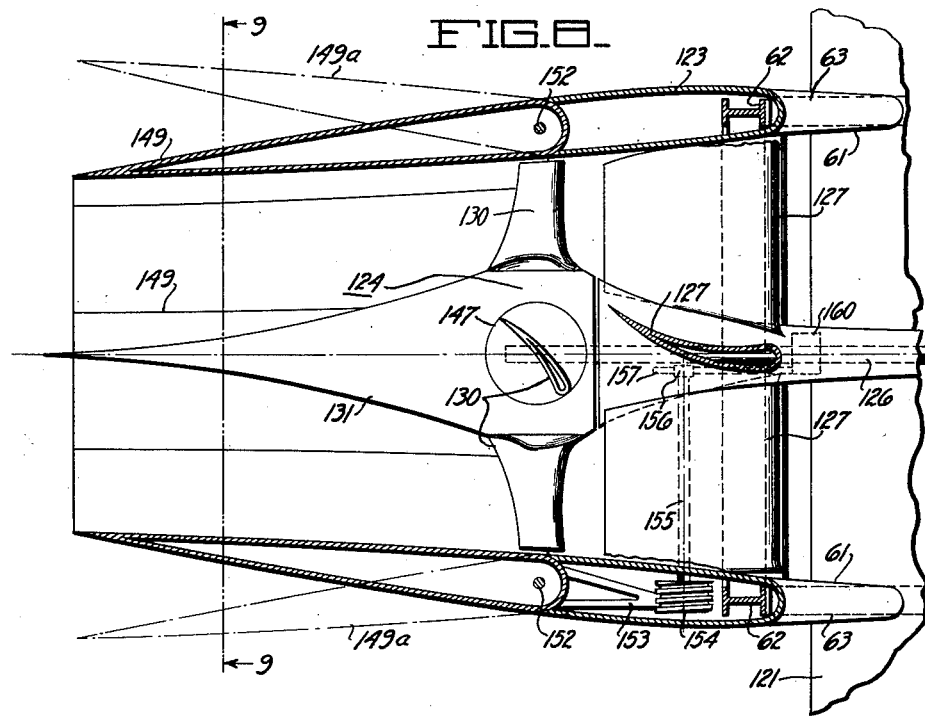
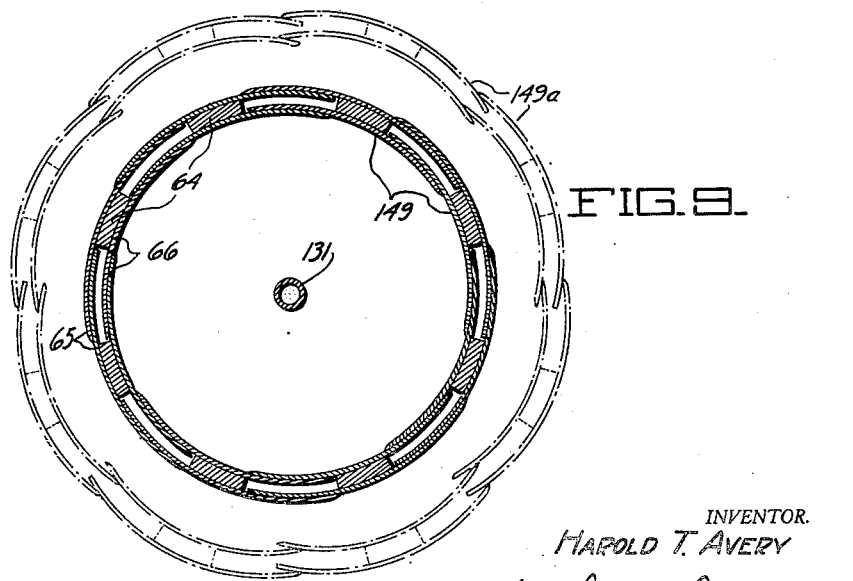

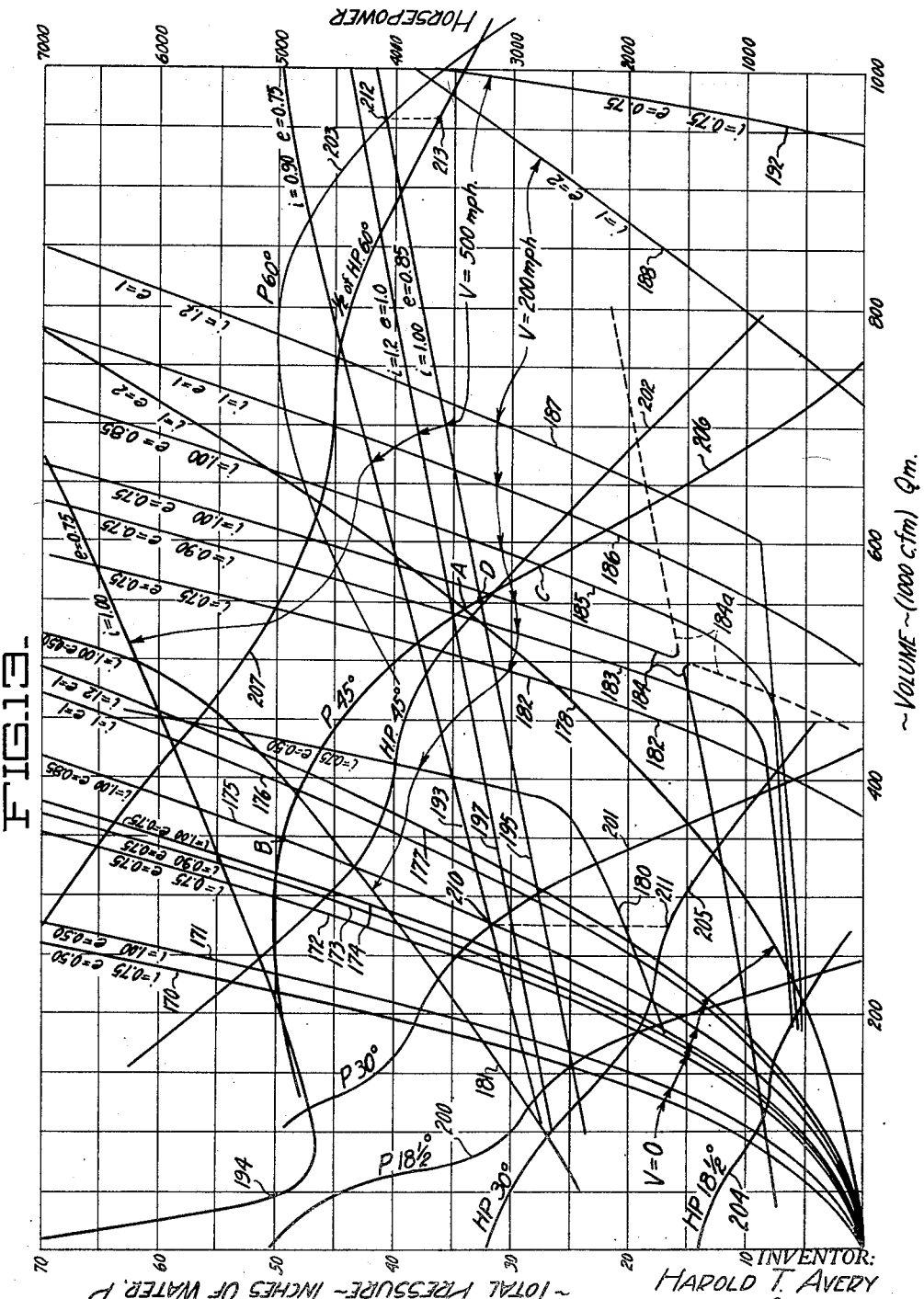

INVENTOR:
HAROLD T. AVERY

Patented May 6, 1952

2,595,504

UNITED STATES PATENT OFFICE 2,595,504

MEANS FOR PRODUCING THRUST

Harold T. Avery, Oakland, Calif.

Application May 28, 1943, Serial No. 488,917

4 Claims. (Cl. 230—114)

The present invention relates to aircraft and particularly to the application of power derived from a prime mover for exerting aerodynamic thrust for the propulsion of such craft, or for other purposes such as the counteracting of torque in helicopters.

The conventional means for exerting aerodynamic thrust in aircraft is by employing a screw propeller to impart energy to the contiguous airstream, the energy imparted being almost entirely in the form of kinetic energy, with very slight changes in static pressures being involved. Many improvements have been made in response to the present and prospective demands for propellers capable of exerting very much greater thrusts, but these have been in the nature of expedients capable of giving only limited amounts of improvement without serious adverse effect on efficiency and not fundamentally altering the mode of operation nor general scale of thrust values obtainable. Certain physical limitations, including particularly the necessity for keeping the resultant air speed past the propeller blade tips below the speed of sound, in conjunction with the limitations on solidity ratios and static pressure which are inherent in the present generally accepted type of propeller if reasonably high efficiencies are to be obtained, have served to prevent very radical increases in the thrust values which it has been found feasible to develop through any single propeller. In an effort to obtain increase in these thrust values the screw propeller in the general form in which it is at present utilized has been brought to a high state of development, and while appreciable further increases will no doubt be made it does not appear probable that the thrust values obtainable can be radically increased above present known maximums except by some basic change in design of the propulsion unit, such as herein disclosed.

The present invention contemplates the production of aerodynamic thrust by employing an airscrew for the purpose of imparting energy to the contiguous airstream, but is distinguished from prior arrangements by the fact that a distinctly greater proportion of such energy initially appears as static pressure. By enclosing the screw propeller in a duct it becomes feasible to control and guide the flow of air approaching, passing through, and leaving the propeller so that relatively large pressure differentials may be built up between the intake and exhaust sides of the propeller. The utilization of these pressures to greatly augment thrust without any sacrifice in propulsive efficiency is made possible by the discovery that to efficiently convert the pressures into thrusts under any chosen conditions of craft position and movement, and of power supplied to the propeller, certain predetermined relationships must be maintained between the structural characteristics of the propeller and of the surrounding duct, and particularly between the diameter and solidity ratio of the propeller and the inlet and outlet areas of the duct and the duct must provide as direct, straight and free a channel for airflow as the requisite control thereof will permit, and as short a length as is consistent with smooth flow and with providing the required inlet and outlet areas.

It is thus made feasible to employ known thrust enhancing structural alterations of screw propellers to a greater extent than would be possible were the propeller rotating in free air. For instance by utilizing in such a duct a propeller having a relatively large hub, and blades widening toward the roots, solidity ratios may be markedly increased without incurring the loss of efficiency which arises from recirculation, particularly at the blade tips and roots, where the propeller is operating in free air.

Known forms of contrarotating propellers could be employed in the duct for the double purpose of increasing the effective solidity ratio and recovering the energy represented by the rotational component of the discharged airstream, but considerable mechanical complications are involved in the dual drive and in the arrangements for providing blade pitch adjustment for the two sets of blades, and since with the ducted arrangement high solidity in a single propeller is not objectionable, and supports otherwise required within the duct may be shaped to fixed vanes for the recovery of rotational loss, it is preferably to employ a single propeller having a relatively high solidity ratio and fixed vanes within the duct for recovering the energy represented by the rotational component of the airstream.

It is also made possible to employ a propeller of much smaller diameter for the production of a given thrust, than would be required to produce the same thrust if the propeller were rotating in free air. The rotational speed of the propeller tips may thus be held well below the speed of sound, at which, as is well known, sharp decreases in efficiency supervene. The velocity of movement of the airstream with respect to the propeller tips, which is substantially the resultant of the rotational tip speed and the airstream's speed in the vicinity of the propeller, is also markedly reduced both by the employment of a propeller of smaller diameter per unit of thrust as above mentioned, and by the utilization of a duct of such shape and dimensions as to automatically limit the flow of air through the propeller, particularly at high craft speeds, to an amount which the propeller can efficiently handle and an amount which will suitably limit tip-air speeds. Thus, at maximum craft speeds the resultant velocity of movement of the airstream with respect to the propeller tips can be caused to be less than the speed of the craft, making it possible for the craft to attain velocities approximating the speed of sound while the resultant velocity of the airstream with respect to the propeller tips remains sufficiently lower to prevent the efficiency losses which would occur were it equal to or higher than the speed of the craft.

Many other advantages, such as the production of adequate thrust at higher altitudes, the facility afforded for structural simplification, minification of profile drag, tip and hub losses and the like arise from the employment of the invention, as will be made clear in the following detailed description of preferred embodiments thereof; objects of the invention, among others, being:

To increase the aerodynamic thrust which can efficiently be exerted by an airscrew;

To make possible the employment of airscrews of relatively high solidity ratio for producing aerodynamic thrust;

To simplify and improve the means employed for recovering the energy represented by the rotational component of the airstream discharged by the airscrew producing aerodynamic thrust;

To make possible the employment of airscrews of smaller diameter per unit of thrust as means for producing aerodynamic thrust;

To make possible the attaining of greater static thrusts, and of better values of thrust per horsepower than now attainable at comparable values of static thrust;

To increase the speed at which aircraft can be efficiently propelled by airscrews;

To reduce the velocity of movement of the airstream with respect to the airscrew tips as compared with the velocity of the craft with respect to the surrounding air;

To make possible the efficient propulsion of aircraft at higher altitudes than those now attainable;

To increase the range of thrust values and of craft speeds within which thrust may be efficiently and reasonably uniformly controlled by adjustment of airscrew pitch;

To simplify and improve airscrews and particularly the pitch adjusting means therefor;

To provide improved steering means for aircraft;

To simultaneously utilize airscrew pitch adjusting devices for steering aircraft and controlling engine speed;

To utilize airscrew ducting means for steering aircraft; and/or

To make possible the exertion of increased lift by the supporting airfoils of aircraft by eliminating irregularities of flow in the impinging airstream.

Additional objects and advantages of the invention will be apparent in the course of the following description of preferred embodiments thereof which is to be read with reference to the accompanying drawings, in which:

Figure 1 is a side view of an airplane equipped with my new type of propulsion unit.

Figure 2 is a partial plan view of the same craft showing the outer duct casing of the propulsion unit partially cut away.

Figure 3 is a similar view of the same propulsion unit on a larger scale, showing also the mechanism for displacing portions of the duct casing to effect steering.

Figure 4 shows the same duct casing similarly cut away, and the displaceable elements thereof deflected for turning the craft.

Figure 5 is a sectional view taken substantially on the line 5—5 of Figure 3, showing particularly the hub on which the blades are mounted and some of the mechanism for adjusting the pitch of the blades.

Figure 5a shows on a larger scale further details of the blade mounting and of the pitch-adjusting structure, as incorporated in all embodiments disclosed.

Figure 6 is a side view a second embodiment of my invention, in which two propulsion units are used to propel a "flying wing."

Figure 7 is a partial plan view of this second embodiment, with the outer duct casing of one of the propulsion units partially cut away.

Figure 8 is an enlarged view of this same unit, similarly cut away and showing also the mechanism for displacing portions of the duct casing to give better performance at different craft speeds.

Figure 9 is a sectional view taken substantially on the line 9—9 of Figure 8.

Figure 10 is a view, partly in cross section, of the governing mechanism for controlling blade pitch so as to maintain desired engine speed.

Figure 11 is a plan view showing the mechanism for selectively controlling the blade pitch in the two propulsion units of the second embodiment, for effecting steering, and also the mechanism for compounding therewith the control effected by the governing mechanism of Figure 10.

Figure 12 is a side view of most of the mechanism shown in plan in Figure 11.

Figure 13 is a diagram relating pressures to volumes of air handled for different possible duct systems at different representative craft speeds, and relating pressures and horsepowers to the same volumes for the propeller within the duct system at different typical blade pitch settings. The entire diagram is based on a six foot diameter propeller turning at 2000 R. P. M.

Figure 14:
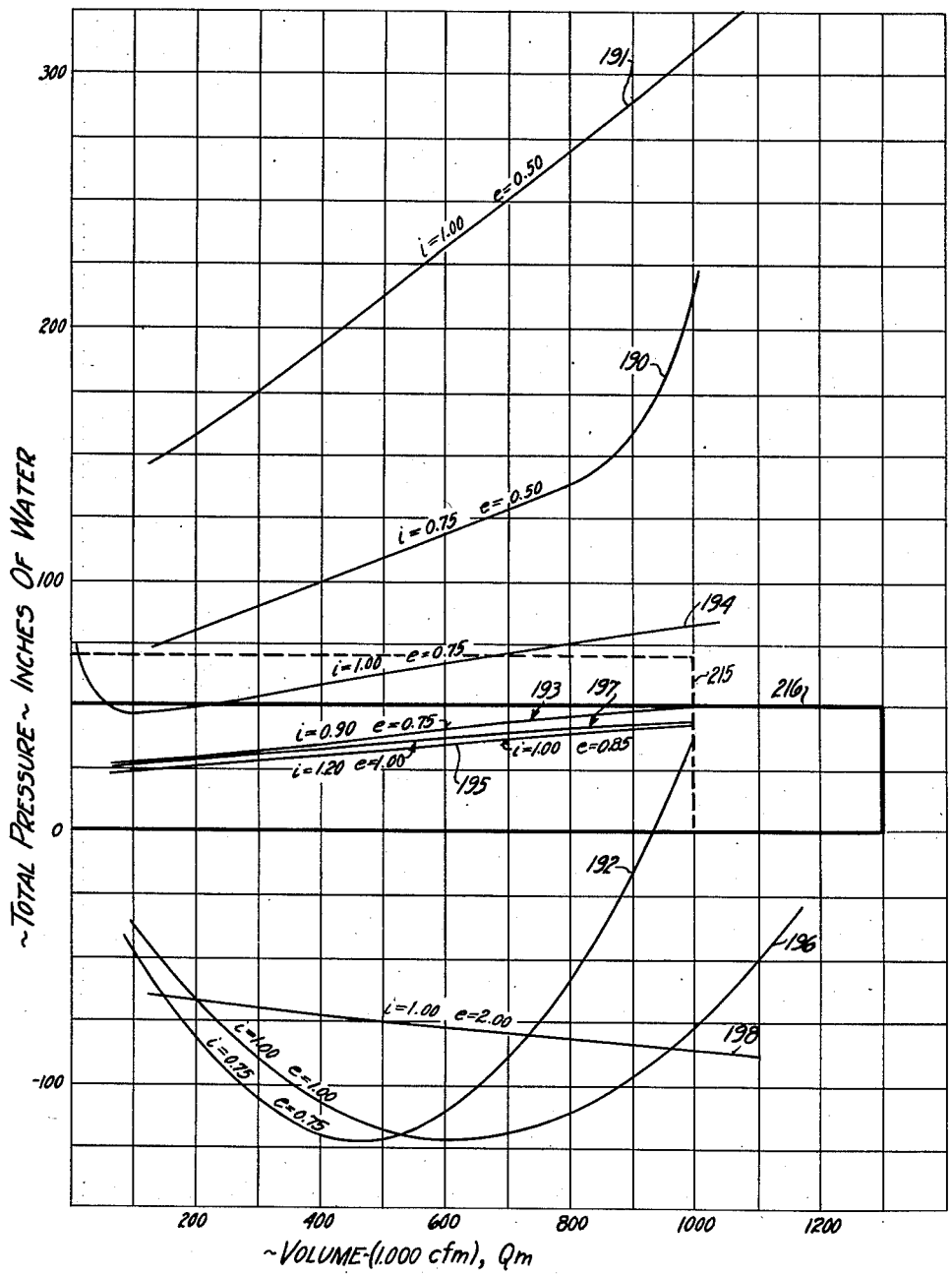

Figure 14 is a diagram similarly relating pressures to volumes of air handled for the same propeller and group of duct systems as in Figure 13, but applies only to a craft speed of 500 miles per hour, and unlike Figure 13 includes pressures far above and below those embraced within a normal working range.

Figure 15:
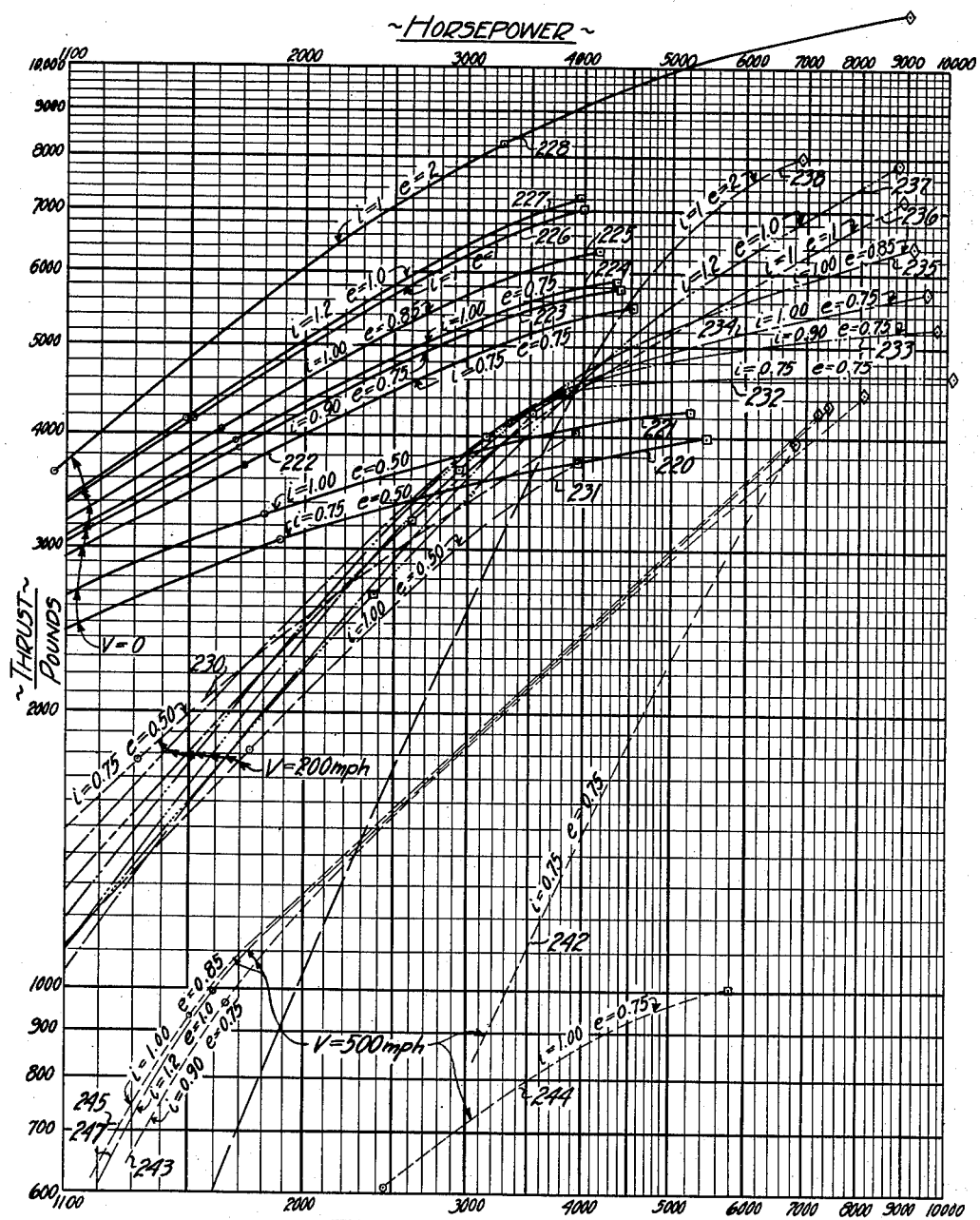

Figure 15 is a diagram plotted to logarithmic scales and relating thrusts to horsepowers for the same group of duct systems and the same representative craft speeds, as those used for Figure 13.

Figure 16:
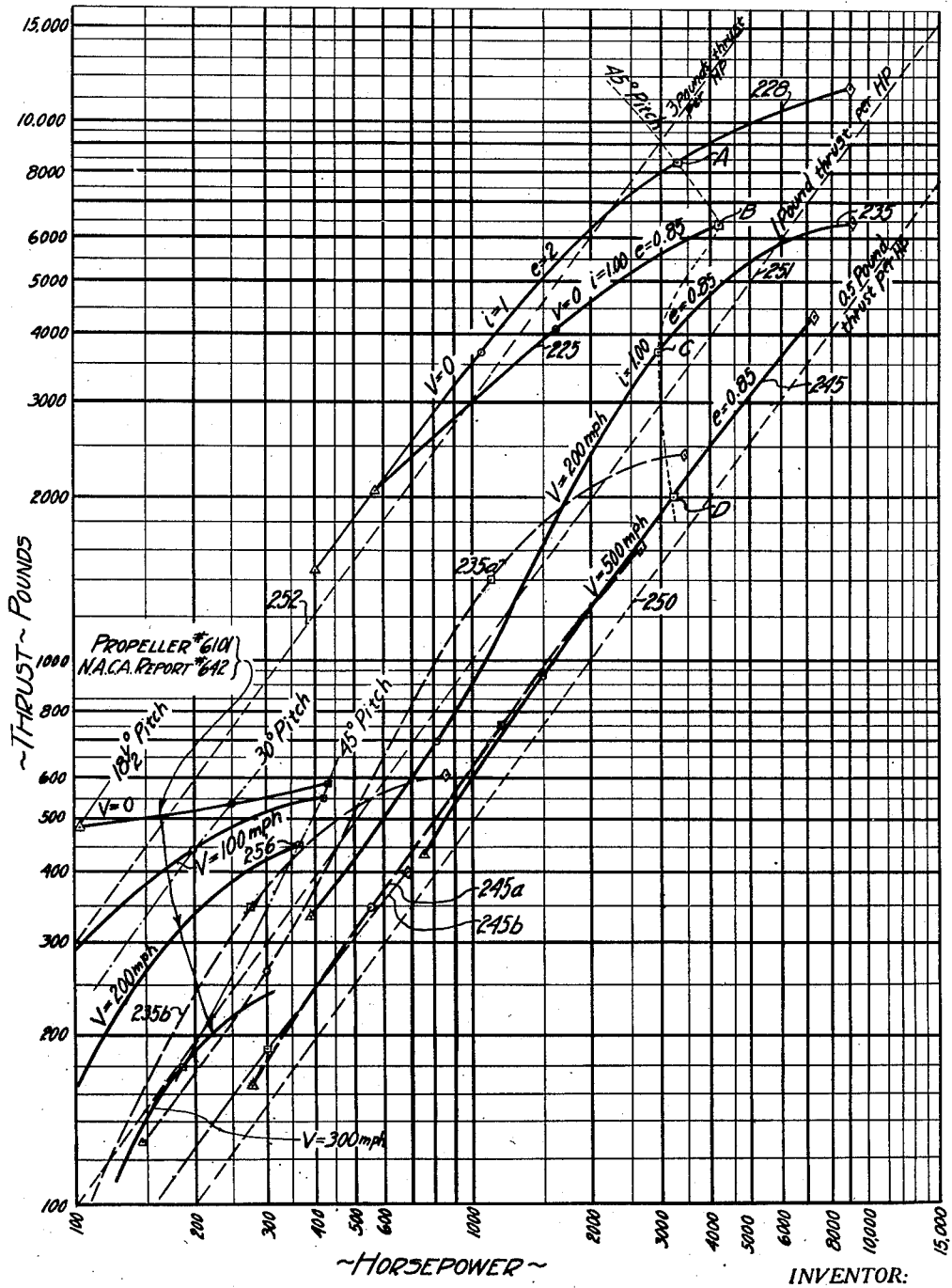

Figure 16 is a similar diagram of thrusts plotted against horsepowers, but covering a larger range of thrusts and horsepowers, and showing particularly the comparison between a few typical curves of Figure 15 and those indicative of the results obtainable from a standard propeller of the same diameter and speed.

Figure 17:
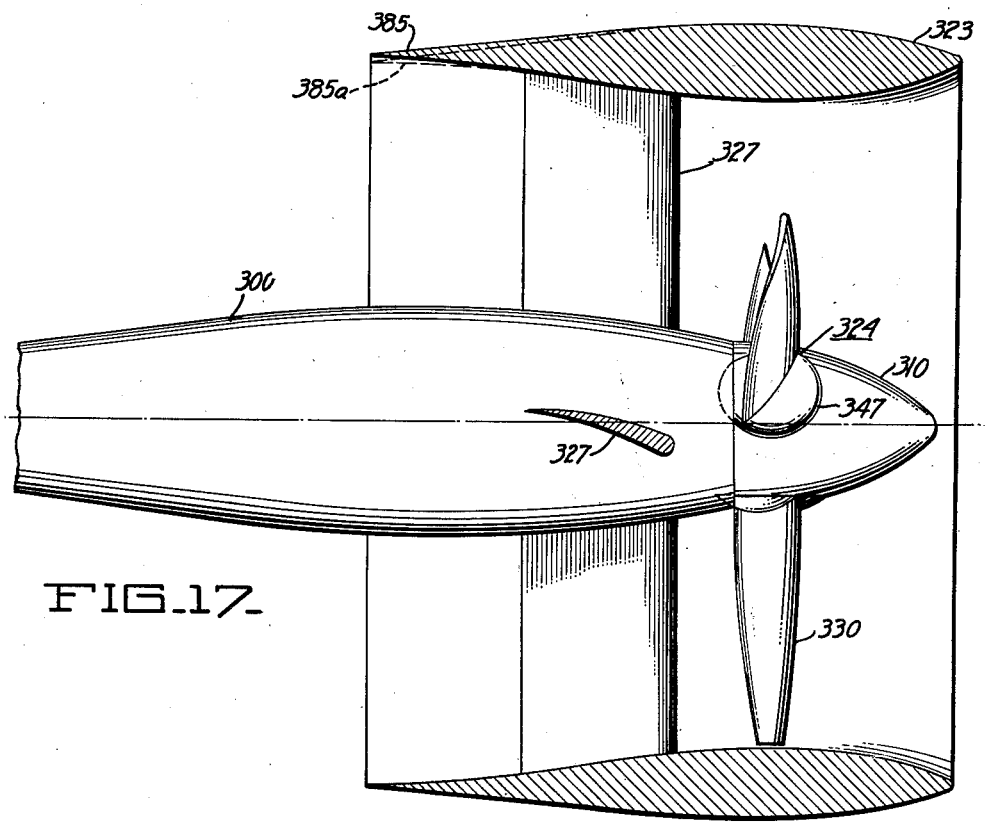

Figure 17 is a side view, partially in section, of a third embodiment of my propulsion unit.

This embodiment is shown as a tractor unit, and is especially designed to give high efficiency under take-off conditions.

Figure 18:
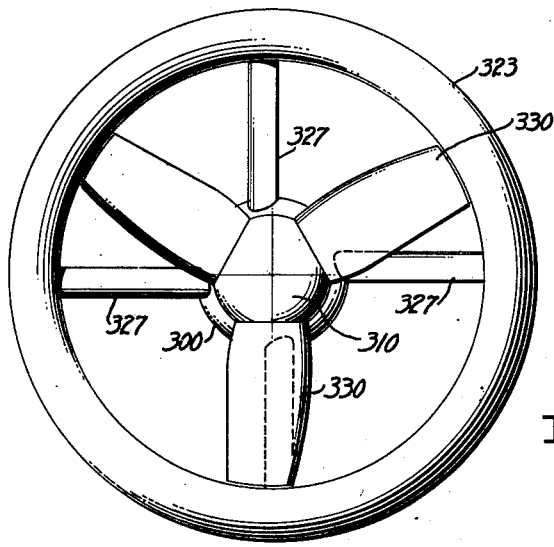

Figure 18 is a front elevation of the unit shown in Figure 17.

Figure 19:
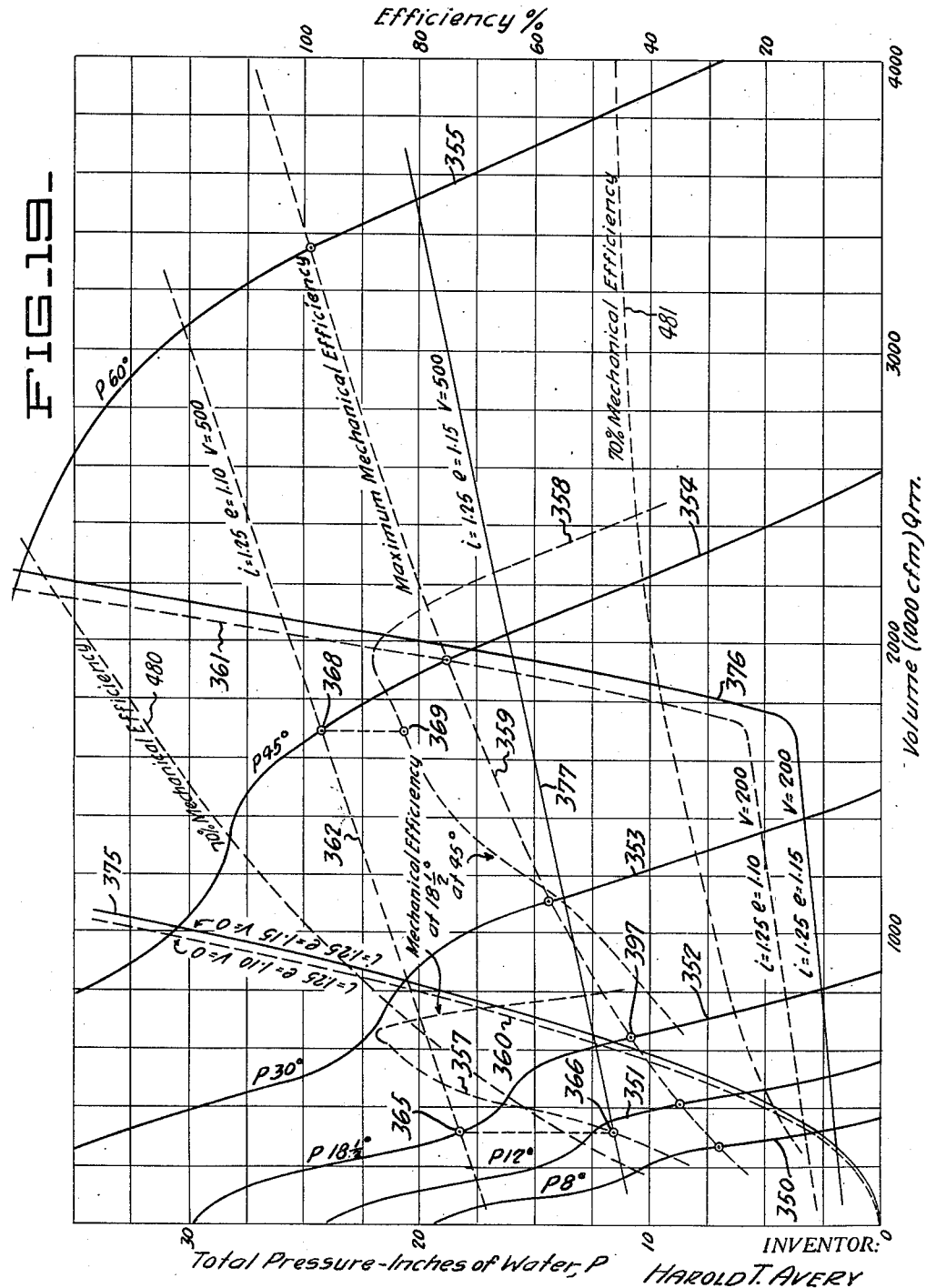

Figure 19 is a diagram relating the third embodiment pressures to volumes of air handled in the manner that Figure 13 relates the corresponding values for the first two embodiments. These third embodiment values are based on a propeller 10 feet in diameter turning at 1500 R. P. M.

Figure 20:
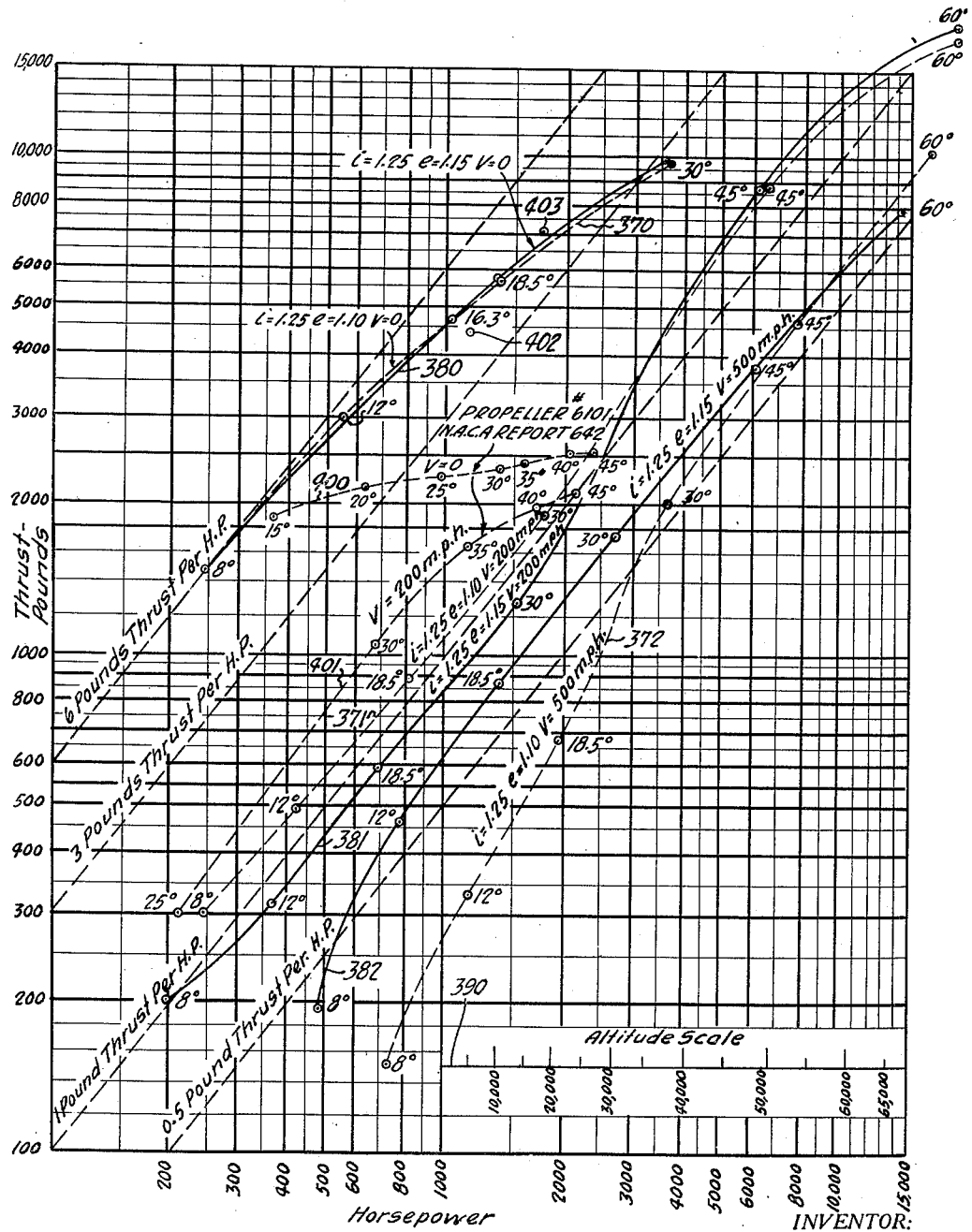

Figure 20 is a diagram plotting the third embodiment thrusts against horsepowers, as Figure 16 plots the first and second embodiment thrusts against horsepowers.

FIRST EMBODIMENT

General construction

In the embodiment illustrated in Figures 1 to 5, inclusive, the airplane comprises the customary fuselage 20 from which the wings 21 project laterally. At the tail end of the fuselage 20 is located the propulsion unit 22 which, as particularly shown in Figures 2 and 3, comprises an outer annular duct casing 23 and a propeller 24, driven by engine 25 through shaft 26.

Integral with the rear part of the fuselage and extending outwardly therefrom are a plurality of curved vanes 27, which vanes are also integral with the duct casing 23 and therefore serve to support it either by the structural strength of the outer shell of the vanes, or preferably, by structural members (not shown) contained within the vanes. The drawings show one vane 27 extending horizontally in each direction and show in cross section one vane extending vertically upward. It is to be understood that these are but indicative of the plurality of similar vanes 27 which extend outward from the fuselage 20 at regular intervals around its circumference, and that those extending at other angles have been omitted from the drawings in order to avoid congestion and possible confusion.

Propeller construction, including pitch adjustment

The propeller 24 includes a plurality of controllable pitch blades 30 extending radially outward from a large hub casing 31, which in the region of the blades takes the form of a zone of a sphere having as its center the common center from which the axes of blades 30 radiate, and which continues rearwardly in a smoothly streamlined shape, approximately conical, but of gradually decreasing taper. A cross-section through the hub portion of the propeller is shown in Figure 5. In order to more clearly show the contour of casing 31 the upper portion of the hub is shown in Figure 5 as though cut through in the vicinity of a propeller blade 30, while the lower portion is shown with the section taken intermediate between blades, but it is to be understood that the number of blades is not necessarily odd, as this arrangement of sectioning might be taken to indicate, nor necessarily even, as might be assumed from certain other views of the propeller. The number of propeller blades 30 is, however, preferably prime to the number of fixed vanes 27, and the number of blades is preferably sufficient to bring the solidity ratio (that is the ratio that the area of the projection of the propeller on a plane perpendicular to the propeller axis bears to the area of the circumscribed circle) to a value intermediate one-fifth and unit, being preferably about two-thirds. Also, preferably the width of each blade increases toward its root in such proportion that a differential portion of the blade at each radius is capable of doing the same amount of work on the air as a similar portion at each other radius.

The mechanism for maintaining and adjusting the pitch of the propeller blades 30 is indicated in Figures 5 and 5a. As there indicated shaft 26 may be supported, near its rear end, in a bearing 32 mounted in frame member 33 of the fuselage. Bearing 32 terminate rearwardly in a gear 34 integral with the bearing. Integral with shaft 26 and to the rear of bearing 32 is a hub member 35 which comprises a central hub 36, a plurality of inner lugs 38, each carrying a bearing for supporting the inner end of a shaft 37 (which is an integral part of the corresponding propeller blade 30), and an outer rim 39, for carrying the bearings for supporting the outer ends of shafts 37. Integrally attached to rim 39 is an internal gear 40 concentric with shaft 26. Pivotally mounted on hub 36 is a hub member 41, extending integrally outward from which are one or more arms 42, each carrying a stud 43 on which are mounted two similar but independently rotatable planetary pinions 44 and 46. Planetary pinion 44 meshes inwardly with gear 34, which therefore serves as the sun gear of a planetary system, and which as previously described is integral with the framework of the fuselage. This same planetary pinion 44 meshes outwardly with internal gear 40, which as previously described is integral with propeller hub member 35 and shaft 26. Hence planetary pinion 44 will serve to definitely position stud 43 at all times, causing it to revolve about shaft 26 at a fixed fraction of the speed revolution of the shaft.

Rotatably mounted on the central sleeve portion of bearing 32 is a compound gear including at one end thereof gear portion 10, identical in size and pitch with gear 34, and at the other end a gear portion 11, which may be of any convenient diameter. Gear 10 acts as a sun gear for planetary pinion 46, just as gear 34 does for pinion 44. Rotatably mounted on compound gear 10, 11 is a hub 12 carrying a disc 13 integrally supporting a ring 14 the internal surface of which constitutes an internal gear of the same size and pitch as internal gear 40 previously described. The external surface of ring 14 constitutes a spur gear meshing with a plurality of pinions 15 (one for each blade). Each pinion 15 is integral with a shaft 16 and a worm 17 meshing with a worm gear 18 which in turn is integral with a blade shaft 37 and propeller blade 30. Therefore any rotation of a pinion 15, in one direction or the other relative to the propeller hub, will proportionately increase or decrease the pitch of the corresponding propeller blade 30.

The pitch of the blades is controlled from the craft in accordance with the rotational setting of shaft 45, which extends rearwardly from the craft to the vicinity of the propeller and terminates in a gear 19 meshing with the gear 11, previously described. As long as shaft 45 remains stationary, gear 19 prevents rotation of compound gear 11, 10. As long as gear 10 is held stationary ring gear 14 will be revolved by planetary pinion 46 at exactly the same speed as the propeller, since in the parallel planetary unit which determines the movement of stud 43 sun gear 34 is always stationary and internal gear 40 always turning at the same speed as the propeller With ring gear 14 thus fixed relative to the propeller hub, pinions 15 will remain fixed relative thereto, and the pitch of the blades will remain constant. However, if shaft 45 is rotated in one direction or the other gear 10 will be correspondingly rotated, thus imparting an increment of rotation to planetary pinion 46 which will advance or retard ring gear 14 relative to the propeller hub, which movement will rotate all pinions 15 equally and impart an equal increase or decrease in pitch to all propeller blades.

Because of the fact that less diameter and/or rotational speed of the propeller is required to produce a given thrust the forces imposed upon the propeller blades are less than in an ordinary propeller, which particularly combined with the greater spacing of bearings which may be utilized for supporting the blade greatly reduces the forces resisting pitch adjustment of the blades, thus making it feasible to eliminate the separate source of power for blade adjustment which is usually provided in the vicinity of the propeller hub, and to adjust the pitch by movement supplied from a distance (in this instance the rotation of shaft 45), which movement may be imparted either manually, or automatically as hereinafter indicated.

At the outer end of each shaft 37, and integral therewith is a disc shaped portion 47 which serves as a base for the blade 30. The surface of disc 47 which faces inwardly toward shaft 26 may be a flat circular face, but the surface which faces outwardly forms a portion of the surface of the same sphere as that of the adjacent surface of casing 31, the junction of this spherical surface with the surface of blade 30 being smoothly faired to insure smooth air flow around the root of the blade. Therefore when a blade 30 is rotated on its axis (which is also the axis of shaft 37) to adjust blade pitch, the parts which rotate join the casing 31, with respect to which they are rotated, along a circle lying in a plane perpendicular to the blade axis, the circle being centered on the blade axis, and also constituting a small circle of the sphere defined by the portions of the casing 31 and blade base 47 which join each other. Therefore the blade base 47 joins flush with the casing 31 in all adjusted positions of the blade 30 and the blade blends equally smoothly into its hub member in all adjusted positions, while the hub casing is shaped so as to cause the minimum of air disturbance by its rotation, a consideration which is of particular importance in view of the relatively large hub diameter.

*Duct construction, including guide vanes and steering arrangements*

As previously mentioned, vanes 27 extending radially outward from the rear end of fuselage 20 support the annular casing 23 which forms the outer wall of the duct which guides and controls flow through the propeller 24. In addition to serving their purpose as streamlined supports the vanes 27 serve also to impart to the airstream approaching propeller 24 a rotational velocity opposite to the direction of propeller rotation (which latter is in the direction indicated by arrow 48, Fig. 3), and in an amount as nearly equal as feasible to the average value of the rotational increment of velocity imparted to the airstream by propeller 24.

As clearly indicated in Figure 3 the wall of casing 23 is of a stream-lined cross-section generally similar to an airfoil shape, the wall preferably consisting of an outer sheet covering (shown in cross-section) and in an interior structural framework (not shown).

All of the walls of duct 23 may be permanently fixed with relation to fuselage 20, and conventional control surfaces such as elevators and rudder provided externally of the duct to control the craft. However, if arrangements are provided for entirely controlling the craft by displacement of movable portions of surfaces otherwise required, such for instance as the wings and the walls of duct 23, all surfaces which would otherwise be provided for control purposes may be dispensed with, thereby improving the lines of the craft and reducing the drag.

To this end a rear section 49 of each side wall of the duct 23 is preferably hinged to act as a rudder, in a manner hereinafter described, while the wing tips, carried back well toward the rear, may include ailerons 50 subject to equal and opposite displacement under control of a banking control member, as is customary with ailerons, for controlling the rolling movements of the craft, and also subject to equal and similar displacement under control of a pitch control member, as is customary with elevator surfaces, for controlling the pitching movements of the craft. Alternatively the control of pitching movements may be supplied by hinging rear sections of the top and bottom walls of duct 23 to act as elevators in a manner not shown in the drawings but exactly similar to that illustrated and described for sections of the side walls acting as rudders.

The arrangement illustrated in Figures 1 to 5 contemplates the use of ailerons 50 for controlling pitching as well as rolling movements of the craft, as above described, and the entire duct casing 23 is assumed to be permanently fixed relative to fuselage 20 with the exception of the two rear sections 49 of the side walls of duct casing 23. As particularly illustrated in Figures 3 and 4 these two sections 49 are each pivotally mounted on a hinge pin 52, fixedly supported by the framework of the fixed portion of duct 23. Integral with each pivoted section 49 is a worm segment 53 meshing with worm gear 54, which gear is integral with shaft 55, which shaft extends inwardly through the interior of a vane 27 and has a pinion 56 integrally attached to its inner end. Each of these pinions 56 meshes with a guided rack 57, pivotally connected to a link 58, and each of the links 58 are in turn pivotally connected to a common cross member 59 integral with hub 60, slidably mounted on shaft 26 or on a bearing or sleeve surrounding said shaft. Through linkage (not shown) hub 60 is subject to longitudinal displacement by movement of the steering control member (not shown). Acting through the links 58, this will cause longitudinal displacement of the two racks 57 and rotation of the two pinion, shaft, and worm gear units 56, 55, and 54, which in turn will produce similar angular displacement of the two hinged sections 49 on their support pins 52 controlled in direction and amount by the displacement of the steering member, thus bringing these two sections to angularly displaced positions such as illustrated in Figure 4. This will obviously cause a deflection of the propeller slip stream passing through the duct and of the airstream adjacent to the outside of the duct in a manner which will produce a large yawing moment on the craft and thus effect steering. In case the craft is gliding without propeller operation the airstream both inside and outside of the duct 23 will be similarly deflected and thus produce a similar effect.

For reasons set forth hereinafter the duct 23 is illustrated as preferably having a net area of intake at its forward end approximately equal to the gross area of the propeller disc and a net outlet area at its rear end approximately equal to 85 percent of this value. The shape of the various parts which affect the flow through the duct including particularly to the outer duct casing 23, the portion of fuselage 20 lying within the duct, the vanes 27, and the propeller hub casing 31 are such as to avoid sharp changes in the direction of air flow and to cause the net cross-sectional area of the duct to gradually and smoothly decrease from the intake area to the net propeller area (outside hub casing 31) and to smoothly increase again to the outlet area, with the inner and outer guide surfaces being very nearly parallel to the axis of the propeller at outlet, and the rear end of hub casing 31 reducing to substantially a sharp point at its rear extremity.

SECOND EMBODIMENT

General construction

Figures 6 to 12, inclusive, illustrate the application of a propulsion system generally similar to that just described to a somewhat different type of airplane. This embodiment also includes certain new features relating to the propulsion unit in addition to those disclosed in the first embodiment.

The type of craft illustrated in the second embodiment is that generally referred to as a "flying wing," in that so nearly as feasible the entire structure of the craft is contained within the lines of the craft wings, and the portions extraneous thereto are held to a minimum. As illustrated in Figures 6 and 7 the craft consists primarily of wings 121, with the fuselage 120 appearing only as a slight bulge, particularly upward and forward, beyond the normal wing lines at the center of the craft. In this instance two identical propulsion units 122 and 128 are symmetrically located each side of center immediately in back of the wing. As particularly illustrated in Figure 8 each of these propulsion units comprises guide vanes 127 and a propeller 124, including adjustable pitch blades 130 smoothly blended into blade bases 147 rotatably mounted flush with propeller hub casing 131, all corresponding to the similar parts including vanes 27, propeller 24, blades 30, blade bases 47, and hub casing 31 of the propulsion unit disclosed in the first embodiment.

Duct casing 123, Figure 8, corresponds generally to duct casing 23 of the first embodiment, but instead of being supported by vanes 127, to correspond to the first embodiment, its internal structural members (not shown) may be attached to a structural ring 62 extending the entire distance around the duct casing 123 within its leading edge, and this ring 62 may in turn be integral with beams 63 extending rearwardly out from the wing 121 and housed within streamlined fairings 61 connecting forwardly with the surface of wing 121 and smoothly joined rearwardly into the leading edge of duct casing 123, the beams 62 in turn being integrally joined to the main frame of the craft.

Duct adjustment

As will be developed more fully hereinafter, a duct having, as disclosed in the first embodiment, a net intake area approximately equal to the gross area of the propeller disc and a net outlet area approximately 85 per cent of this amount, will make possible the realization of the objects of the invention to a most gratifying extent at all craft speeds, but still further increase in static thrusts and in thrusts at very low craft speeds can be attained if the outlet area is considerably larger than this value, even twice as great as the propeller disc area, for instance.

Arrangements are therefore provided for altering outlet area over a range which is illustrated as extending from about 85 per cent of the gross propeller disc area to about 200 per cent thereof. To permit of such adjustment the entire rear portion of the duct 123 is made up of a plurality of similar pivoted sections 149 (Figure 8) mounted on hinge pins 152 supported by the fixed framework of the forward section of duct 123. Each section 149 is displaceable about its hinge pin 152 from a position corresponding to the positions in which the side sections are shown in cross section in Figure 8 to positions corresponding to the dotted line positions 149a, such displacement being effected through a segment 153 (one of which is integral with each section 149), a worm gear 154 (there being as many such gears as segments 153 and one such gear cooperating with each segment). Each gear 154 is integral with a pinion 156 being connected to it by a shaft 155 which extends inwardly through a vane 127, each such pinion meshing with a rack 157, and all such racks being attached to a sleeve 160 for longitudinal displacement thereby. Thus each of the sections 149 is brought to a definite angular position for each longitudinal position of sleeve 160, which sleeve may be connected by linkage (not shown) so that it may be positioned, either automatically or manually to bring the outlet area to its most favorable size.

In order that the rocking outward of the sections 149 may not open gaps in the walls of the duct, the construction may be such as illustrated in Figure 9. Each section 149 may include a structural frame 64, indicated in Figure 9 as being a single member but optionally consisting of any suitable form of rigid framework to which is fastened an outer curved plate 65 and an inner curved plate 66. The outer plates 65 may successively overlap each other in an echelon-like arrangement, as illustrated in Figure 9, and the inner plates 66 also similarly overlap as illustrated. When the sections 149 are in their innermost positions, as illustrated in solid lines in Figures 8 and 9 (which is the condition utilized at all higher craft speeds), this over lap is considerable, and except for the very slight jog at overlap both inner and outer surfaces may conform to substantially true circles. However, when sections 149 are rocked to their outermost positions 149a, as shown in dotted lines in Figures 8 and 9 (which is the condition utilized at very low craft speeds), the overlap is reduced to a minimum, and as illustrated in Figure 9 the sections may, when so rocked, join in the shape of very broad shallow corrugations, but since these run parallel to the airflow, and further in view of the fact that this condition occurs at low air speeds, they have almost no detrimental effect on air flow or thrust.

Propeller drive, including governing

As illustrated in Figure 7, the two propulsion units 122 and 128 may be driven by a single engine 70, the shaft 71 of which carries a bevel gear 72 meshing with two bevel gears 73 integral with shafts 74 and worms (not shown) which drive worm gears 75 integral with propeller shafts 126, corresponding to shaft 26 of Figure 5, which transmit drive to the propellers 124 just as shaft 26 does to propeller 24. Each of these propulsion units may also include means for effecting propeller blade pitch adjustment, similar to that illustrated in Figures 5 and 5a and described hereinbefore, and this pitch adjustment may be utilized for two principal purposes; namely, differential control of the pitch setting of the two propulsion units in the manner hereinafter described may be utilized to effect steering, while the simultaneous increase or decrease of pitch on the two units may be utilized to adjust the power consumed by the two propellers to a value effective to keep the engine speed at a predetermined value. As will be shown hereinafter the alteration of power required in this way will also alter thrust by an amount which, under most operating conditions, will be very nearly in direct ratio to the change in power requirement.

In Figure 10 is shown a governor 78 adapted for use in conjunction with the engine and propulsion system, for controlling engine speed through simultaneous adjustment of pitch on the two propellers, as above mentioned, while in Figures 11 and 12 is shown a twin differential unit 79 for combining the control thus exercised by governor 78 with a differential control for effecting steering, to be described hereinafter, and for feeding the resultant control movement to each propulsion unit through mechanism outlined in Figure 7.

As indicated in Figure 7, the governor 78 may be mounted on the forward end of engine shaft 71, and serve to position, in the manner described immediately hereafter, certain elements of the differential unit 79, which when combined with certain positioning of elements of the unit 79 by the steering controls, as will be later described, serves to rotatably position two shafts 80 and 81 in accordance with the desired pitch setting of propulsion units 122 and 123, respectively. The rotational movement of shaft 80 is transmitted through bevel gears 82 to shaft 83, and thence through spur gears 84 to shaft 45, the rotation of which controls the pitch of the propeller blades in propulsion unit 122 in the manner previously described and illustrated in Figures 5 and 5a. Through a similar set of mechanism, shaft 81 similarly controls the pitch setting in propulsion unit 128.

As illustrated in Figure 10 the governor 78 includes a hub 89 integrally attached to engine shaft 71 and carrying an integral bracket 90. Pivotally mounted on the bracket 90, by means of the pin 91 is the lever 92, the lower end of which rests against a ball 93 which is guided in a hole located centrally of hub 89. The opposite side of ball 93 presses against a stud 94 carried by insulation piece 95, which is integral with the current carrying leaf 96 pivotally mounted at 97 to the bracket 98 which is attached to, but insulated from, the frame plate 99. Screwed into a tapped hole in frame plate 99 is speed adjustment knob 100 which carries a support for one end of compression spring 101, the other end of which is arranged to exert pressure against leaf 96. Leaf 96 carries two electrical contacts 103 arranged so that they may establish contact with either of two fixed contacts 104 and 105 when leaf 96 is rocked in one direction or the other. A governor with mechanical construction very similar to this is disclosed in Avery Patent 2,152,171, to which reference may be had for further details of construction.

The governor operates as follows. When engine shaft 71 accelerates the centrifugal force on lever 92 is increased, producing an increased tendency for it to rock counter-clockwise, as viewed in Figure 10, about its pivot pin 91. When this tendency becomes sufficient it will displace ball 93 toward the right and cause leaf 96 to rock counter-clockwise about its pivot 97 against the pressure of spring 101, thereby removing contacts 103 from contact 105 and, if the tendency is great enough, bringing them against contact 104. Contacts 104 and 105 are respectively connected to the reversing terminals 106 and 107 of a reversible electric motor 108, through limit switches 109 and 110, respectively. The opposite terminal of motor 108 is connected to the electric power source 111, the opposite side of which is connected to leaf 96. Therefore when contacts 103 touch contact 105 reversible motor 108 operates in one direction (adapted to decrease blade pitch on the two propellers) while when they touch contact 104 the motor operates in the opposite direction (adapted to increase blade pitch). For any given setting of knob 100 there will be a certain very definite engine speed at which the centrifugal force on lever 92 becomes great enough to cause it to overcome spring 101 and open contacts 103—105, and another very slightly greater speed which will permit it to compress spring 101 sufficiently to close contacts 103—104. Therefore whenever the engine is operating at less than these speeds contact 105 will supply current to operate motor 108 to decrease pitch, and thereby decrease the load on the motor, while when the engine is operating above these speeds contact 104 will cause the reverse operation. Only when the engine speed is intermediate between these two speeds will contacts 103 remain out of contact with both contacts 104 and 105 and blade pitch remain constant.

In order to limit the range through which motor 108 may operate to effect pitch changes limit switches 109 and 110 may be operated in a manner such as indicated in Figure 10. Shaft 113 of motor 108 may be threaded and carry a nut 114, guided against turning with the shaft, as by fixed guide 115. The nut 114 is therefore fed along the shaft to a position indicative of the current average pitch setting of the two propulsion units, for the ensuing description of the twin differential assembly 79 and its operation will make clear that the control fed in by motor 108 at all times determines the average pitch setting of the two units. As indicated diagrammatically in Figure 10, limit switches 109 and 110 may be opened selectively by the rocking, in one direction or the other, of a double bell crank 116. When nut 114 approaches either end of its range of travel it engages one or the other face of a notch 117 in the depending arm of the bell crank 116 thereby rocking the bell crank on its pivot 118. When the average pitch setting has reached the minimum of its range (say 0° for instance) the nut will have been fed to the left, rocking bell crank 116 clockwise, opening switch 110 and preventing motor 108 from effecting any further pitch decrease. Switch 109 remains closed however and therefore as soon as the engine speed is brought above the governed setting contacts 103—104 close and commence increasing pitch. If such increase should be carried beyond the desired maximum for which the opposite limit switch 109 is set (say 90° for instance), nut 114 is fed to the outer limit of its range, rocks bell crank 116 counter-clockwise and opens limit switch 109. By thus utilizing the limit switches to control the limit of the average of the pitches of the two propulsion units, rather than the absolute limit of either one individually, it becomes possible to place the lower limit so that no net forward thrust would be created while the engine was coming up to its normal operating speed but, as will be evident from the description of steering control immediately following, one propeller will be given negative pitch and the other positive if the steering control be displaced while the engine is thus under speed, and a strong turning force for aiding in maneuvering on the ground can thus be set up with no net forward thrust until the engine is opened up to the point where it can drive the propellers, with the amount of differential pitch thus set, at more than the speed set for governing.

To change engine speed, knob 100 (which may be connected for operation from the pilot's seat) may be turned, which will screw the stem of the knob in or out through frame plate 99 thereby increasing or decreasing the length and load of spring 101, and consequently the amount of centrifugal force necessary to counterbalance the spring.

*Differential pitch adjustment for steering*

As previously mentioned steering is effected through differential adjustment of the pitch of the propellers in the two propulsion units 122 and 128. Movement corresponding to the desired steering effect is fed into the planetary unit 79 by means diagrammatically illustrated in Figures 7 and 11, in which the steering control member is shown as bar 133, pivotally mounted on pin 134 and operatively connected to the cord 135, which is carried over suitable pulleys and is wrapped around and fastened to the pulley 136 so as to rotate that pulley in proportion to the movement of bar 133, which bar is angularly displaced on its pivot pin 134 to effect steering in a manner corresponding to that frequently used in aircraft. Pulley 136 is integral with a bevel gear 138 which meshes at two opposite points on its pitch line with two similar but opposite bevel gears 140. Each bevel gear 140 is in the form of a hollow ring and is integral with an internal gear 141, which in turn is integrally attached to a spider 142 carried by a hub 143, which is freely rotatable on its support shaft. The support shaft for one of these hubs 143 is the pitch adjustment shaft 80, previously described, and for the other the opposite corresponding shaft 81.

Each of the internal gears 141 is an element of a planetary assembly which includes three planetary gears 145 rotatable on pins 146 integrally mounted in planetary carrier plates 148 which are integrally attached to the respective shafts 80 and 81 previously mentioned. Each of the groups of planetary gears 145 mesh with a sun gear 162, these two sun gears being integrally attached to opposite faces of a worm gear 163 which meshes with worm 164 which is integral with motor shaft 113, previously described as positioning these planetary assemblies in accordance with the desired sum of propeller pitches. One of the shafts, for instance shaft 81, may extend through the center of the sun gear assembly (gears 162 and 163) as indicated in Figure 11, this sun gear assembly being freely rotatable upon the shaft.

The operation of the planetary assemblies is therefore such that any displacement of steering control member 133 from its neutral position causes a proportional displacement of each of the internal gears 141, the displacement of these two gears 141 being equal and opposite, thereby causing one set of planetaries to roll as far in one direction around its sun gear as the other set rolls in the other direction about its sun gear. Thus the displacement of the steering member will produce equal and opposite rotational displacements of the shafts 80 and 81, thereby increasing the pitch on one propeller as much as it decreases it on the other propeller. This will leave the total net load very nearly unaltered, but if the increase of pitch does not increase load by exactly the same amount that the decrease of pitch decreases it, the governor will automatically increase or decrease both pitches by enough to exactly reestablish the balance between engine output and load.

The operation of the governor was previously traced up to the point where it produced selective rotation of motor shaft 113 in one or the other direction to increase or decrease pitch on both propulsion units. Through the action of worm 164, integral with shaft 113, on worm gear 163, integral with sun gears 162, any movement of shaft 113 will cause the two sun gears to feed the two groups of planetaries around inside their internal gears in the same direction and by the same amount, thus causing displacement of shafts 80 and 81 in the same direction, and the introduction of equal increments of pitch to the two propellers.

The new type of propulsion unit herein disclosed is very much better adapted for use with a system depending upon pitch changes for steering control than is a conventional type of propeller. This will be particularly evident from a glance at Figure 16, which will be more fully described hereinafter. For the present purpose it is sufficient to note that the figure is a chart of thrust plotted against horsepower, the four solid line curves which extend across the main part of the chart applying to a propulsion unit of my new type having a six foot diameter propeller revolving at 2000 R. P. M. each curve covering a range of pitches starting at 18½° pitch at the lower left and continuing to 60° pitch, except for one curve which, as shown, ends at 45° pitch. At the lower left of the chart are shown four curves covering corresponding data for a conventional propeller identified on the chart and ranging from 18½° minimum pitch (though necessarily higher minimum on certain of the curves) up to 45° maximum pitch. It will be noted that with the conventional propeller the effect of pitch changes on thrust is very slight, particularly at lower speeds, that it varies very greatly with change of speed, and that only a limited and somewhat different range of pitches at different speeds is very effective in contributing toward such change of thrust as is effected. With my new propulsion unit, on the other hand each change of pitch brings about a large change of thrust over the entire range of pitches investigated, and the rate of such change is very satisfactory at all speeds, meaning that pitch control would give much more adequate steering effect at all pitches and all craft speeds than is the case with present conventional propellers.

THIRD EMBODIMENT

As will be apparent from the performance estimates given hereinafter, propulsion units with solidity ratios as high as indicated in the first and second embodiments will give particularly fine performance at high speeds and high altitudes and will give very much larger thrusts per square foot of propeller disc area than present propellers at all speeds including static conditions, but will tend to be slightly inferior to present propellers in static thrusts per horsepower. On many types of craft the maximum load with which the craft can take off is of especial importance, and therefore thrust per horsepower under static and low speed conditions must be made as large as feasible. The performance calculations developed hereinafter will make it clear that static thrusts per horsepower on any type of propulsion unit are subject to very definite limits which can only be raised by decreasing the thrust per square foot of outlet area. Since in order to keep the thrusts per pound of weight of propulsion mechanism as low as feasible it is desirable to keep tip speed as high as is consistent with keeping the tip air speeds below the speed of sound, it becomes desirable where take off load is critical to use somewhat larger diameters and lower solidity ratios for a given range of horsepowers and thrusts than contemplated in the specific arrangements illustrated in the first and second embodiments.

A propulsion unit particularly designed for this type of service is illustrated in Figures 17 and 18, and certain performance data relative to it is charted in Figures 19 and 20. As will be apparent from the drawings this unit is illustrated in the form of a tractor propulsion unit located on the front end of an engine nacelle 300 which may be supported by the structure of the craft in any conventional manner (not shown). The propeller 324, at the front end of nacelle 300, comprises three adjustable pitch blades 338 blending into blade roots 347 which are substantially flush with spinner nose 310. The propeller is surrounded by duct 323 which is supported from nacelle 300 by means of four streamlined straightening vanes 327 located in back of propeller 324.

In order to maintain good thrust at speeds in excess of present aircraft practice the net exhaust area of the duct is maintained slightly smaller than the intake area, and in order to secure the maximum static thrust per horsepower both are made as large as feasible with respect to propeller disc area. As illustrated the intake area is 1.25 and the exhaust 1.15 times the propeller disc area. In order to secure these areas with the shortest practicable duct and the easiest possible angles of contraction from intake to propeller and more particularly of expansion from propeller to outlet, the net propeller area is made as large as possible by providing a hub relatively smaller than in the first two embodiments. This does not adapt the propeller to handle as high static pressures as is the case with the first two embodiments and may require narrowing in the base of the blades so that the root portions do less work on the air than the outer portions, but these compromises are acceptable in view of the lower static pressures that this lower solidity propeller will be called upon to handle.

The shape of the inner wall of duct 323 is determined by the inlet and outlet area considerations and smooth streamlining in between, as discussed above. The outer wall of the duct has been designed to give minimum resistance in flight, particularly at high speeds, by studying the stream flow of the air particularly in the light of the relative quantities of air passing through and around the duct in accordance with performance calculations mentioned hereinafter.

As will be apparent from these performance calculations this unit can be expected to give better static thrusts per horsepower than are attained on typical present day aircraft, combined with efficient thrusts at speeds and altitudes exceeding those of present practice. The improved static thrust per horsepower has, however, been obtained at the expense of a portion of the compactness attained in the first two embodiments.

The advantages of the invention may therefore alternatively be utilized either to give the maximum of compactness with some sacrifice of thrust per horsepower during take off, or to give maximum thrust per horsepower at take off, according to the type of the craft on which the unit is installed. In any case the unit will give efficient thrusts at speeds and altitudes markedly exceeding those attained by present day craft.

PERFORMANCE

*Basis for estimating and comparing performance*

In order to ascertain the degree to which a propulsion unit constructed in accordance with the foregoing disclosure is capable of achieving the objects originally outlined, it is necessary to estimate the thrust obtainable and power required under different conditions of flight typical of the complete range of possible operating conditions. By repeating such an investigation for various embodiments of the invention in which the critical dimensions of the propulsion unit are varied to give different relative proportions and relationships, the limits of the useful range of proportions within which the propulsion unit may advantageously be constructed, may be ascertained.

The thrust created by a propulsion unit may be estimated by at least two rather different methods. One method is from the momentum considerations involved which require that:

$$T = M \times dV \qquad (1)$$

in which
$T$ = thrust exerted by propulsion unit, in pounds.
$M$ = mass of air handled, in slugs per second.
$dV$ = velocity imparted to air by propulsion unit, in feet per second.

Assume: Air mass = .002378 slugs per cubic foot.

$Q_m$ = air handled in thousands of cubic feet per minute.
$V_t$ = terminal velocity of air after leaving propulsion unit, in miles per hour.
$V$ = craft velocity, in miles per hour.

Then:

$$M = .03963 Q_m \qquad (2)$$

and $$dV = 1.4667(V_t - V) \qquad (3)$$

From (1), (2), and (3)

$$T = .05812 Q_m (V_t - V) \qquad (4)$$

A second method of estimating thrust is to figure the net longitudinal component of the pressure differences existing on all areas of the propulsion system. The thrust contributed by the active portion of the propeller is:

$$T_p = p a A_d \quad (5)$$

in which $T_p$ = thrust contributed by active portion of propeller, in pounds.
$p$ = pressure developed by propeller, in pounds per square foot.
 = difference between static pressure in front of propeller and that behind it.
$A_d$ = gross area of disc swept by propeller, in square feet.
$a$ = portion of $A_d$ that is active.

$$= \frac{A_d - \text{cross sectional area of hub}}{A_d}$$

Let P = pressure developed by propeller, in inches of water.
Then $$P = p/5.2 \quad (6)$$

and $$T_p = 5.2 P a A_d \quad (7)$$

The thrust contributed by the pressure on the walls of the duct system, which thrust may be either positive or negative, may be estimated by considering a differential length of the duct and integrating for the entire duct.

Considering a differential length of duct.

Let $dA$ = difference of cross-sectional area of duct at beginning and end of differential length, considered as positive if duct is expanding toward rear.
$p_s$ = static pressure in differential length of duct, in pounds per square foot.
$T_d$ = longitudinal component of static pressure on walls of differential length of duct, in pounds, considered positive when directed forward.
$P_s$ = static pressure in differential length of duct, in inches of water.

Then $$T_d = p_s \, dA = 5.2 P_s \, dA \quad (8)$$

Let $A$ = cross-sectional area at any point in duct, in square feet.
$v$ = velocity of air at same point in duct, in miles per hour.
$P_v$ = velocity head, in inches of water.
$P_t$ = total head, in inches of water = $P_s + P_v$ Then $$v = \frac{1000 Q_m}{88 A} = \frac{11.36 Q_m}{A} \quad (9)$$

and $$P_v = \frac{v^2}{2029} = \frac{.0636 Q_m^2}{A^2} \quad (10)$$

At all points upstream from propeller total pressure, $P_t$, is the same, neglecting friction losses. At a point far enough upstream not to be disturbed by the propulsion unit the static pressure, $P_s$, is zero, and the relative air velocity is the craft velocity, V. Therefore, if we let subscript 1 identify conditions upstream from the propeller, and subscript 2 conditions downstream from the propeller:

$$P_{t1} = P_{s1} + P_{v1} \quad (11)$$

$$P_{t1} = 0 + \frac{V^2}{2029} \quad (12)$$

Since this same total pressure applies immediately in front of the propeller disc, and there is no appreciable difference in velocity on the two sides of the propeller disc, but a static pressure difference of P;

$$P_{t2} = P_{t1} + P = \frac{V^2}{2029} + P \quad (13)$$

As we enter duct $P_{s1}$ does not remain zero, but at all points above propeller $$P_{s1} = P_{t1} - P_{v1}$$

Therefore $$P_{s1} = \frac{V^2}{2029} - \frac{.0636 Q_m^2}{A^2} \quad (15)$$

and $$P_{s2} = \frac{V^2}{2029} - \frac{.0636 Q_m^2}{A_2} + P \quad (16)$$

Evaluating Equation 8 for conditions upstream from the propeller:

$$T_{d1} = 5.2 P_{s1} \, dA = 5.2 \left( \frac{V^2}{2029} - \frac{.0636 Q_m^2}{A^2} \right) dA \quad (17)$$

Similarly, for conditions downstream from the propeller, Equation 8 becomes:

$$T_{d2} = 5.2 P_{s2} \, dA = 5.2 \left( \frac{V^2}{2029} - \frac{.0636 Q_m^2}{A^2} + P \right) dA \quad (18)$$

Let $i$ = ratio of net area of duct intake to gross area of fan disc.
$e$ = ratio of net area of duct exhaust to gross area of fan disc.

Then:

Intake area = $i A_d$
Net propeller area = $a A_d$
Exhaust area = $e A_d$

Let $T_D$ = total static pressure on all duct walls.

Then $$T_D = \int_{A=iA_d}^{A=aA_d} T_{d1} + \int_{A=aA_d}^{A=eA_d} T_{d2} \quad (19)$$

Inserting the values of $T_{d1}$ and $T_{d2}$ from Equations 17 and 18, and integrating:

$$T_D = .002563 V^2 A_d (e - i) + .3307 \frac{Q_m^2}{A_d} \left( \frac{1}{e} - \frac{1}{i} \right) + 5.2 P A_d (e - a) \quad (20)$$

Since the only points at which the airstream passing through the propulsion unit can contact the craft to transmit thrust to it are on the propeller blades, which thrust is estimated in Equation 7, and on the walls of the duct and the duct core, including the portion of the fuselage within the duct, the propeller hub, and the propeller tail piece 31, as well as the vanes 27, all of which thrust is estimated in Equation 20, the total thrust may be estimated as the sum of these two values:

$$T = T_p + T_D$$
$$= 5.2 P a A_d + .002563 V^2 A_d (e - i) +$$
$$.3307 \frac{Q_m^2}{A_d} \left( \frac{1}{e} - \frac{1}{i} \right) + 5.2 P A_d (e - a)$$
$$= .002563 V^2 A_d (e - i) + .3307 \frac{Q_m^2}{A_d} \left( \frac{1}{e} - \frac{1}{i} \right) + 5.2 P A_d e$$
$$\quad (21)$$

It will be noted that the ratio "$a$," representing the proportion of the propeller disc that is active has cancelled out, indicating that the thrust depends only on the intake and exhaust areas, and is independent of variations in cross-section at intermediate points. Of course this ratio "$a$" will affect the characteristics of the propeller itself, which enter into the above equation as P and $Q_m$, and if the contractions, or more particularly the expansions, within the duct are too sudden or irregular energy losses will be increased, but the above equation indicates that if smooth flow channels are preserved "$a$" can be chosen to give the best propeller characteristics, and for these characteristics the thrust will be determined solely by craft speed and the duct intake and exhaust areas.

Equation 13 indicates that $$P = P_{t2} - P_{t1} \quad (22)$$

In view of the fact that static pressure will be zero at the point that the air leaving the propulsion unit attains its terminal velocity, and $$P_{t2} = P_{s2} + P_{v2} \quad (23)$$

therefore $$P_{t2} = 0 + \frac{V_t^2}{2029} \quad (24)$$

Substituting Equations 12 and 24 in Equation 22 we have $$2029P = V_t^2 - V^2$$

If we consider the case of a propulsion unit of any given dimensions propelling a craft at any selected speed, $A_d$, $e$, $i$, and V are all known. Therefore the three Equations 4, 21, and 25 express the relationships that must exist between four variables, namely, T, $Q_m$, P, and $V_t$, and for any given propeller operating at any selected speed, and having its blades set at any selected pitch a curve can be plotted covering the relation between $Q_m$ and P. Fortunately we have enough data from experiments on fans of characteristics similar to those assumed for the propeller to accurately construct such curves for at least certain lower blade pitch settings, and to approximate them for higher pitch settings. Therefore such a curve and the three equations mentioned establish the relationships that must exist between the four variables, thereby fixing each of them.

From such a study it is immediately evident that the terminal velocity, $V_t$, of Equations 4 and 25 cannot, at least in general, be the velocity at the outlet of the duct system, but that in general a positive static pressure will exist across the outlet which will act to gradually accelerate the air as it moves away from the duct system until, as the static pressure falls off to zero, the acceleration ceases and the terminal velocity is reached. This corresponds in general to the conditions pertaining with a conventional type of propulsion system, in which a negative static pressure (less than atmospheric) exists in front of the propeller, and a positive static pressure behind it, in spite of the fact that there is no surrounding duct to retain the pressure, and this static pressure gradually falls off to zero as the air moves away from the propeller while the air accelerates, gaining half of the total increase in velocity imparted to it by the propeller after the air leaves the propeller. The only important difference between the air leaving a conventional propeller and that leaving my propulsion unit is that it becomes feasible to work with higher static pressures and secure greater velocity increments after the air leaves the unit than with the conventional propeller.

*Method of estimating performance*

(a) PERFORMANCE OF FIRST AND SECOND EMBODIMENTS

As indicated above Equations 4, 21, and 25 provide us with three equations in four variables, providing we consider the propulsion unit dimensions ($A_d$, $e$ and $i$) and the craft speed (V) as known. By simultaneous solution of the three equations the variables T and $V_t$ may be eliminated and an equation secured relating P to $Q_m$. Leaving the propeller dimensions $A_d$, $e$, and $i$, and the craft velocity, V, in algebraic terms this equation is:

$$P = \frac{-b \pm \sqrt{b^2 - 4ac}}{2a} \quad (26)$$

in which:

$$a = \left(89.5 \frac{A_d e}{Q_m}\right)^2 \quad (27)$$

$$b = 179.0 \frac{A_d e}{Q_m} V + 7.896 e(e-i)\left(\frac{A_d}{Q_m}\right)^2 V^2$$
$$- 1019\left(\frac{e}{i} - 1\right) - 2029 \quad (28)$$

$$c = 0.001946(e-i)^2\left(\frac{A_d}{Q_m}\right)^2 V^4 +$$
$$32.39\left(\frac{1}{i} - \frac{1}{e}\right)^2\left(\frac{Q_m}{A_d}\right)^2 + 0.03822(e-i)\frac{A_d}{Q_m}V^3 -$$
$$11.382\left(\frac{1}{i} - \frac{1}{e}\right)\frac{Q_m}{A_d}V - 0.5021\frac{(e-i)^2}{ei}V^2$$
$$(29)$$

In order to apply these to a specific example let us assume a six foot diameter propeller, and accordingly substitute $A_d = 28.27$ square feet, which reduces Expressions 27, 28, and 29 to the following:

$$a = 10^6 \times 6.4 \frac{e^2}{Q_m^2} \quad (30)$$

$$b = 5060 \frac{e}{Q_m}V + 6310 e\left(\frac{e-i}{Q_m^2}\right)V^2 - 1019\left(\frac{e}{i} - 1\right) - 2029$$
$$(31)$$

$$c = 1.555\left(\frac{e-i}{Q_m^2}\right)^2 V^4 +$$
$$0.04052\left(\frac{1}{i} - \frac{1}{e}\right)^2 Q_m^2 + 2.494 \frac{e-i}{Q_m}V^3 -$$
$$0.4026\left(\frac{1}{i} - \frac{1}{e}\right)Q_m V - 0.5021\frac{(e-i)^2}{ei}V^2$$
$$(32)$$

It is still necessary to assume specific values for craft velocity, V, and inlet and exhaust area ratios, $i$, and $e$, and the possible combinations of these is almost limitless. However, if we investigate a well assorted group of ducts for three craft speeds, namely $V=0$, $V=200$ miles per hour, and $V=500$ miles per hour, we can secure a good idea of performance over a large range of conditions. In Figure 13 curves 170 to 178, inclusive, plot the relationship between pressure, P, and volume, $Q_m$, for $V=0$, as applied to nine differently shaped ducts having the intake ratios, $i$, and exhaust ratios, $e$, as labeled on the respective curves. These curves have been determined from Equation 26 in accordance with Expressions 30, 31 and 32, by inserting the above mentioned values of V, e, and i. Curves 180 to 188, inclusive, are similar curves for the same respective ducts for V=200 miles per hour. Curves 190 to 198, inclusive, of Figures 13 and 14, are similar curves for the same respective ducts for V=500 miles per hour, but of these curves 190, 191, 196, and 198 fall entirely outside the bounds of Figure 13 and therefore appear on Figure 14 only. Since the equations from which these curves are plotted are second degree equations, they will in general give two pressures for each volume. For instance, as shown in Figure 13, curve 184 splits near a 500 value of $Q_m$ and returns as shown by the two dotted curves 184a, points on which satisfy all equations, but will not be maintained in operation as the tendency is for the system to promptly revert to the higher pressure, lower volume conditions indicated by curve 184 in solid lines. The other curves which similarly satisfy the equations, but do not represent stable operating conditions, for other duct dimensions and velocities are omitted from the drawings.

The curves 180 and 198 are, of course, strictly characteristic of the respective ducts, and represent the net increments in total pressure which must be delivered to the airstream in order to force the indicated volumes of air through the particular ducts at the indicated craft speeds, neglecting frictional losses. Ordinarily frictional losses are the principal ones determining the volume of air that can be forced through a duct system, particularly where long ducts and low volumes are concerned, but in the present instance the exit losses in both static pressure and velocity head are so large as compared with frictional losses, that the latter are in almost negligible percentage of the whole and are more than counterbalanced by the gain in pressure due to the action of straightening vanes 27 in recovering the rotational component of the slip stream, which compensating gain is also neglected in the present analysis.

Curve 200, Figure 13, shows total pressures plotted against volumes of air delivered for a six foot diameter propeller turning at 2000 revolutions per minute with its blades set at 18.5 degrees average effective pitch, and having a solidity ratio of approximately 65%. These values would apply to the first and second embodiments. Curve 204 is the corresponding plot of horsepower against volumes. These curves have been determined from recent practice in the field of axial flow fans, corrected according to well known fan laws to the diameter and speed above mentioned. Curves 201 and 205 are corresponding pressure and horsepower curves for the same propeller operating at the same speed but with the blades adjusted to 30 degrees average effective pitch; while curves 202 and 206 are similar pressure and horsepower curves for 45 degrees pitch, and curves 203 and 207 similar pressure and horsepower curves for 60 degree pitch, except that the ordinates of curve 207 correspond in each instance to half the horsepower required at 60 degrees pitch in view of the fact that the curve of full horsepowers would lie almost entirely outside the bounds of the drawing.

It will be noted that none of the pressure curves pass above a total pressure of 50 inches of water. Estimation of the expected performance at 45 degree and 60 degree pitch angles, from data available at lower pitches, would indicate that considerably higher pressures would be expected, and it is believed that with sufficient refinement in control of air flow through the propellers higher pressures can be obtained, but the estimates contained herein are based on the assumption that it may not prove practicable to secure higher pressures than this for the present. It is further assumed that although attempts to build up pressures above 50 inches may result in uncontrolled flow, cutting off pressures at or below this figure, no reductions in corresponding horsepower requirements will ensue.

The intersections of curves 170 to 198, inclusive, characteristic of the ducts, with the pressure curves 200 to 203, inclusive, characteristic of the propeller at its various pitch settings determine the pressure and volume which satisfy both the requirements for operation of the duct system and the capability of the propeller to deliver. For instance point 210, is the intersection of curve 201 with curve 175 and therefore indicates that the six foot propeller turning at 2000 R.P.M. in a duct having net intake area equal to 100 percent of gross propeller area and an outlet area equal to 85 percent of the same will, with its blades set at 30 degree pitch and the craft standing still, deliver 276,000 cubic feet of air per minute at a total pressure of 31.4 inches of water, while the corresponding point 211 on the horsepower curve 205 indicates that this will require 1630 horsepower. Similarly point 212, where curve 203 intersects curve 195, indicates that by increasing blade pitch to 60 degrees, and craft speed to 500 miles per hour, this same propeller will deliver 959,000 cubic feet per minute through this same duct system supplying a total pressure of 40.8 inches of water in so doing, while the corresponding point 213 on curve 207 indicates that this will require 7240 horsepower. Pressure, volume, and horsepower can similarly be determined for the intersection of each of the duct curves 170 to 198, inclusive, with each of the propeller pressure curves 200 to 203, inclusive.

As the speed of the craft increases, the effect of duct areas on pressure requirements becomes more and more pronounced. This will be particularly apparent by reference to Figure 14, which is similar to Figure 13 except that it covers a greatly enlarged range of pressures, and a slightly enlarged range of volumes, and shows only the pressure curves 190 to 198, inclusive, covering the nine ducts at a 500 mile per hour craft speed. The rectangle 215 shown in dashed lines corresponds to the limits of Figure 13, while the rectangle 216 shown in solid lines corresponds approximately to the extreme limits of the propeller pressure curves 200 to 203, inclusive. Therefore only curves passing through the rectangle 216 can be utilized in production of thrust, and since thrust increases both with pressure and volume only curves passing into the upper right quarter of this rectangle will give maximum thrust, and only curves traversing practically the entire upper half of it will give good thrust at all pitch settings. It will be observed that ducts having exhaust areas equal to or larger than their respective intake areas will involve negative pressures over most, or all, of the working range, while those in which the exhaust areas are 25 percent or more below intake areas run into such large positive pressures as to be almost, or entirely, out of the running for production of thrust. However ducts having the exhaust area almost 15 percent less than intake area fall within approximately the ideal range of pressures, regardless of whether the areas are specifically somewhat smaller or larger than propeller area.

As previously mentioned the pressures, volumes, and horsepowers for each duct at each craft speed and propeller pitch setting can be determined from the intersections of curves on Figure 13. From each set of these, the terminal velocity can be determined by means of Equation 25 and then the thrust by means of Equation 4. From the thrusts and horsepowers thus obtained the curves of thrusts plotted against horsepowers (curves 220 to 247, Figures 15 and 16) are obtained. In these figures triangles enclose the points applying to 18.5 degrees pitch, circles those applying to 30 degrees pitch, squares those applying to 45 degrees pitch, and diamonds those applying to 60 degrees pitch. Curves 220 to 228, inclusive, cover static thrust conditions; curves 230 to 238, inclusive, cover the conditions which pertain when the craft is travelling at 200 miles per hour; and curves 242 to 245, and 247, cover the conditions when the craft speed is 500 miles per hour.

Referring to the static thrust conditions (curves 220 to 228) it will be noted that the greatest thrusts, and best thrusts per horsepower, are obtained with the largest duct areas, and that enlargement of exhaust area has particularly favorable effect, as indicated for instance by curve 228 covering a duct with intake area equal to 100 percent and exhaust area equal to 200 percent of propeller area. However, when craft speed reaches 200 miles per hour this particular duct gives extremely poor performance at less than 3500 horsepower, although excelling at horsepowers ranging from 4000 to 7000, as indicated by curve 238. At 500 miles per hour no thrust can be obtained from this duct, as evidenced from the position of pressure curve 193 in Figure 14.

Curves 192 and 194, Figure 14, enter the rectangle 216 to such a limited extent that the duct represented by the latter cannot produce favorably large thrusts at 500 miles per hour, and that represented by the former can only do so for a very limited range of pitch adjustment. This result is shown by curves 242 and 244 of Figure 15. Curves 243, 245, and 247 cover three ducts which give almost equally good thrusts at 500 miles per hour. It will be noted that each of these apply to ducts having intake areas 17% to 20% larger than the respective exhaust areas. While relative performance of these three ducts at other speeds and at various horsepowers varies, with one excelling under certain conditions and another at other conditions, the duct having $i=1.00$ and $e=0.85$ gives rather consistently good performance under all conditions, and this has therefore been selected for the preferred embodiments illustrated in Figures 1 to 12, inclusive.

Curves 225, 235, and 245 covering the performance of a propulsion unit having this duct system at 0, 200 and 500 miles per hour respectively have been repeated in Figure 16 on a scale which permits extending them over a larger range of values, as has also curve 228 covering a unit having intake area 100 per cent, and exhaust area 200 per cent of propeller area at zero velocity, which particularly at higher horsepowers gives the best static thrusts of any of the units for which performance data is charted in Figures 15 and 16, and corresponds to the propulsion unit previously described for the second embodiment with its casing adjusted to give maximum exhaust area. Comparison of these curves against the lines 250, 251, and 252 (which as noted on the drawing are loci for points which correspond to one-half, one, and three pounds thrust per horsepower, respectively) indicate how well the various units sustain their thrust per horsepower at higher power and thrust values, and particularly so at higher speeds.

(b) PERFORMANCE OF THIRD EMBODIMENT

For any given duct dimensions, that is for any chosen values for $i$, $e$, and $A_d$, the preceding equations can be utilized to determine the relationship between volume of air handled and thrust, for static thrust conditions, as follows:

Substituting $V=0$ in Equations 4 and 25, Equation 4 becomes $$T = .05812 Q_m \times V_t \quad (33)$$

and Equation 25 becomes $$V_t = \sqrt{2029P} \quad (34)$$

Substituting Equation 34 in Equation 33 we have $$T = 2.618 Q_m \sqrt{P} \quad (35)$$

or $$P = \frac{.1459 T^2}{Q_m^2} \quad (36)$$

Substituting in Equation 21 $V=0$ and the value of P from Equation 36 we have $$T = .3307 \frac{Q_m^2}{A_d}\left(\frac{1}{e} - \frac{1}{i}\right) + .7587 \frac{T^2 A_d e}{Q_m^2} \quad (37)$$

Solving this for $Q_m$ gives $$Q_m = \sqrt{\frac{1.512 e A_d T}{1 \pm \sqrt{\frac{e}{i}}}} \quad (38)$$

which is an expression for air volume in terms of thrust and duct dimensions.

Similarly basic energy considerations and the equations developed hereinbefore make it possible to determine horsepower in terms of air volume and the pressure and mechanical efficiency developed by the propeller as a fan or air moving means.

The kinetic energy present in the airstream may be expressed, as follows:

$$KE = \tfrac{1}{2} M v^2_t \quad (39)$$

in which $KE$=kinetic energy of airstream in ft. pounds per second.

Substituting the value of M from Equation 2 and expressing velocity in miles per hour and then substituting the value of $V^2_t$ from Equation 25 for $V=0$.

$$KE = .04262 Q_m V^2_t = 86.48 Q_m P \quad (40)$$

$$\text{Air } HP = \frac{KE}{550} = 0.1572 Q_m P \quad (41)$$

$$\text{Actual } HP = 0.1572 \frac{Q_m P}{E} = H \quad (42)$$

in which $E$=mechanical efficiency of propulsion unit as an air moving device, and $H$=actual horsepower.

The thrust per horsepower may be determined by dividing Equation 35 by Equation 42 and substituting from Equation 36.

$$\frac{T}{H} = \frac{16.65 E}{\sqrt{P}} = 43.60 \frac{E Q_m}{T} \quad (43)$$

And substituting for $Q_m$ from Equation 38

$$\frac{T}{H} = \frac{53.61 E}{\sqrt{1 \pm \sqrt{\frac{e}{i}}}} \sqrt{\frac{e A_d}{T}} \quad (44)$$

Equation 44 indicates that for a duct having any given ratio of inlet to exhaust areas the static thrust per horsepower developed varies directly as the mechanical efficiency of the air moving unit (which efficiency reaches a maximum of approximately 90% in modern axial flow fans), and varies inversely as the square root of the thrust per square foot of duct exhaust area. Since it has been shown that the $e/i$ ratio must be held within a rather narrow range of values in order for my propulsion unit to properly develop its exceptionally high speed thrust characteristics, and since the thrust per horsepower is affected as the fourth root of this ratio, variation of the ratio within its favorable range has almost negligible effect on the static thrust per horsepower. Therefore with the mechanical efficiency of the air moving device held as near as feasible to its maximum value the only way in which the static thrust per horsepower can be appreciably improved is to reduce the thrust per square foot of duct outlet, which for designing to any given thrust value means enlargement of the net area of duct outlet. To maintain high speed characteristics any great enlargement of outlet would have to be accompanied by substantially corresponding enlargement of inlet. Since the shortness of duct and directness of air flow through the duct is an outstanding characteristic of my propulsion unit, distinguishing it from the so-called "jet" propulsion systems and giving it many of its characteristic advantages, any considerable enlargement of intake and exhaust areas must be accompanied by enlargement of propeller disc area. In order that this enlargement may not increase the thrust and horsepower out of the desired ranges the solidity ratio of the propeller must be dropped, which in general means a decrease in the static pressures developed by the propeller. Equation 43 makes it quite apparent, however, that this in itself will improve the static thrust per horsepower. These have therefore been the controlling considerations in developing the design of the third embodiment.

Equation 44 may be rewritten as an expression for determining exhaust area $(eA_d)$ in terms of air horsepower (EH) desired static thrust (T) and duct proportions $(e/i)$:

$$eA_d = T^3 \frac{1+\sqrt{e/i}}{(53.61EH)^2} \qquad (45)$$

This indicates that the static thrust obtainable from a given horsepower may be increased indefinitely by sufficient enlargement of duct exhaust area, but since such enlargement must be in the ratio of the cube of the thrust if intake area is enlarged in proportion to exhaust area, and at a slightly higher ratio yet if intake area is held constant, it is evident that practical limitations, particularly those relating to flight conditions, limit the extent to which the increasing of static thrust in this manner can advantageously be carried.

While the performance calculations for the first and second embodiments were based on a six foot diameter propeller turning at 2000 R. P. M., those for the third embodiment are based on a ten foot diameter propeller turning at 1500 R. P. M. Also while performance data for nine differently proportioned ducts was given in connection with the first two embodiments corresponding data is only given for two different ducts in connection with the third embodiment, one of these having substantially the ratio of reduction from inlet to outlet which was selected as best for the first two embodiments, and the other having less reduction to the extent required for best performance with a propeller having the larger diameter and lesser solidity of the third embodiment.

Referring to Fig. 19, curves 350 to 355, inclusive, show the relationship between volume and pressure for a ten foot diameter propeller turning at 1500 R. P. M. with the blades set at the various pitch angles labelled on the respective curves. Two typical efficiency curves are included, curve 357 plotting efficiencies against volumes for 18½° blade pitch, as covered by pressure curve 352, while curve 358 similarly plots efficiencies for 45° blade pitch as covered by pressure curve 354. Curve 359 is the locus of the pressure-volume points which give maximum efficiency, that is it intersects each of the pressure curves 350 to 355 at its point of maximum efficiency, namely at the volume at which the peak of the corresponding efficiency curve is located. Curves 480 and 481 are similarly the loci of the pressure-volume points at which efficiency falls off to 70% and therefore constitute the upper and lower limits of what may be considered as a region of reasonably high mechanical efficiencies. Outside of this region efficiencies become too low for favorable operation.

Curves 360, 361, and 362 plot pressures against volumes for a duct having intake area 1.25 times propeller disc area $(i=1.25)$ and exhaust area 1.10 times propeller disc area $(e=1.10)$, the three curves covering craft speeds of 0, 200, and 500 miles per hour, respectively. The net ratio of reduction from duct intake to exhaust is somewhat comparable in this duct to those found best in the first and second embodiments. It will be noted, however, that in the lower volume range, high speed gives very low efficiency. For instance, point 365 (the intersection of curves 352 and 362), fixes the volume of air handled in this duct by the propeller with 18.5° blade pitch for a craft speed of 500 miles per hour, and point 366 indicates that for this volume and pitch the efficiency is only about 45 percent. Points 368 and 369 indicate, however, that at 45° pitch the efficiency has risen to more than 82%. It is evident, however, that curve 362 is located too high with respect to curve 359 for maximum efficiency to be attained at 500 miles per hour with the duct and propeller combination at any pitch, and that at lower pitches curve 362 is much too high for good efficiency. At slightly less than 30° pitch curve 362 crosses curve 480 and passes outside the zone of favorably high efficiencies.

These conditions are reflected in Figure 20 in which the curves 370, 371, and 372 plot thrusts against horsepowers for this same duct, at craft speeds of 0, 200, and 500 miles per hour respectively. The figures appearing opposite each point identified on these curves indicate the blade pitch which gives the thrust and horsepower values corresponding to that point. From curve 372 it will be observed how badly the thrust per horsepower falls off for pitch settings of less than 30° (which in this case means for sea level horsepowers of less than 3600) for a craft speed of 500 miles per hour. Referring again to Figure 19, it is evident that curve 362 should be dropped down into the vicinity of curve 359 if better efficiencies are to be realized at the lower settings. This can be accomplished by decreasing the amount of duct contraction. For instance holding the inlet unchanged at $i=1.25$ and enlarging the outlet from the previous $e=1.10$ to $e=1.15$ drops the 500 mile per hour pressure curve down to the position indicated by curve 377. The effect of this change on pressures at other speeds is shown by curves 375 and 376, while curves 380, 381 and 382 (Figure 20) illustrate the effect of these changes on thrust, being a marked improvement in the lower horsepower ranges at 500 miles per hour, slightly poorer performance in approximately the same ranges at 200 miles per hour, and negligible change in the static thrusts. If powered with a 1000 horsepower motor it will be noted from curves 372 and 382 that this increase from an $e$ ratio of 1.10 to that of 1.15 has increased the thrust at 500 miles per hour from 270 pounds to 625 pounds. The efficiency has increased in this instance from 36% to 83.3%. To visualize how small a dimensional change may be responsible for thus more than doubling the thrust, if the propeller diameter is 10 feet and the nacelle core deductible from gross exhaust area is 3.5 feet in diameter, an $e$ ratio of 1.10 gives a duct diameter at outlet of 11.06 feet, while an $e$ ratio of 1.15 gives a diameter of 11.28 feet, or as shown in Figure 17 changing the duct from the outline 385a (shown in dotted lines) to the outline 385 (shown in solid lines) gives more than 100% increase in the thrust value at 500 miles per hour.

*Effect of altitude*

As with a conventional propeller the effect of altitude on my propulsion unit is to reduce both thrust and horsepower substantially in proportion to density. At 30,000 foot altitude, for instance, the standard density is approximately 0.3740 of that at sea level, and therefore horsepowers and thrusts would both be decreased in this ratio. Curve 235a (Figure 16) shows the projected performance of the first and second embodiments of my propulsion unit at 200 miles per hour at 30,000 foot altitude on this basis, being on logarithmic scale a simple displacement of the corresponding sea level curve 235. Similarly curve 245a plots 500 miles per hour performance at 30,000 foot altitude. It will be noted that at this speed, and even more markedly at 200 miles per hour my propulsion unit gives better thrusts per horsepower at 30,000 feet than it does at sea level for horsepowers up to 1760.

Similarly at 60,000 feet elevation the density is 0.09413 of that at sea level, and the thrusts and horsepowers at 60,000 feet will therefore bear this ratio to the corresponding values at sea level. Curves 235b and 245b (Figure 16) indicate the resulting thrust-horsepower curves for 60,000 foot altitude, for craft speeds of 200 miles per hour and 500 miles per hour respectively. It will be noted that even at this extreme altitude my new propulsion unit will give greater thrusts than a conventional propeller of the same diameter and speed will give at sea level.

In Figure 20 the effect of altitude is indicated in a slightly different manner with respect to the performance curves for the third embodiment. Instead of drawing additional curves to show performance at a few specific altitudes over a complete range of horsepowers, as was done in Figure 16, a scale is added to Figure 20 which serves to indicate performance at a specific horsepower over a complete range of altitudes. This scale, identified as 390 in Figure 20, is adapted to indicate for all altitudes up to 65,000 feet the performance of a propulsion unit constructed in accordance with the third embodiment and powered by an engine capable of delivering 1000 horsepower at all altitudes. This scale is so constructed that each altitude appears on the scale in line with a horsepower equal to the 1000 horsepower delivered divided by the density ratio for that altitude, that is the ratio of standard density at that altitude to standard density at sea level. By going vertically upward from any chosen altitude on the altitude scale 390 to the thrust curve corresponding to any selected duct and flight velocity, the thrust and horsepower coordinates of the point thus selected on the thrust curve will each be equal to the true thrust and horsepower obtained by applying 1000 horsepower to my propulsion unit at that altitude divided by the density ratio for that altitude. Therefore the thrust per horsepower and the blade pitch of the selected point will be the correct values for that altitude, but the thrust and horsepower values pertaining to that point must both be divided by the density ratio, which ratio is of course equal to the horsepower of the point divided by 1000.

For instance, the altitude of 30,000 feet appears on scale 390 approximately opposite 2670 horsepower. Therefore if we wish to determine the performance of the third embodiment of my propulsion unit at a speed of 500 miles per hour, as represented by curve 382, when supplied with 1000 horsepower at an altitude of 30,000 feet we follow vertically upward from the 30,000 foot mark on scale 390 to curve 382 intersecting that curve at a thrust value of 1750 pounds, very slightly to the left of the point on curve 382 labelled 30°. From this we know that for this unit to absorb 1000 horsepower at an altitude of 30,000 feet the blades would have to be set at approximately 30° pitch, and that the thrust per horsepower would be $$\frac{1750}{2670}=0.655 \text{ pound per horsepower}$$

and the thrust would be 1750 pounds divided by the density ratio of 2.67, or 655 pounds.

As another instance, for a density ratio of ⅛ we would read the appropriate curves on the 8000 horsepower line, using blade pitches and thrusts per horsepower directly as read from the curves, but multiplying the thrusts as read from the curves by the density ratio of ⅛. From scale 390 we see that these values would apply to conditions occurring at an altitude of approximately 54,000 feet, still assuming, of course, that we actually apply 1000 horsepower to the propulsion unit at that altitude.

*Criterion for effect of duct shape*

From the foregoing, and particularly from the discussion of third embodiment performance, it will be evident that in order to secure the best performance under any given set of flight conditions the duct proportions must be so chosen that the duct pressure curve for those conditions (corresponding to curves 361, 362, 376 and 377 of Figure 19 for instance) must be made to substantially coincide, in that portion of the curve corresponding to that set of flight conditions, with the locus of the maximum efficiency points of the propeller pressure curves (this locus being curve 359 in Figure 19), and must throughout as much of its length as represents flight conditions of any importance stay within the region of reasonably high efficiencies (this region being the area lying between curves 480 and 481 in Figure 19).

The conception of this relationship as constituting a criterion by which the propeller and its surrounding duct may be so related to each other as to secure the most favorable thrust conditions for any desired set of flight conditions, is believed to be new. It leads to adoption of a short, simple direct duct, offering the minimum of energy loss consistent with performing what this approach indicates to be the all important function of the duct, namely that of controlling air flow past the propeller under desired sets of flight conditions to those volumes of flow which will give the best efficiencies and highest total thrusts consistent therewith.

By obtaining mathematical expressions for the locus of maximum efficiencies and for a volume pressure curve characteristic of a duct, and equating them for selected flight conditions a direct method for selection of duct proportions can be developed. The locus of the maximum efficiency points of the propeller pressure curves may be computed as follows:

Let $Q_0$ = quantity of air handled in thousands of cubic feet per minute when propeller is operating at maximum efficiency with the blades set to $18\frac{1}{2}°$ pitch at three-quarters of outside radius, and propeller is turning at normal operating tip speed.

$P_0$ = corresponding pressure in inches of water.

On the basis that volumes of air handled vary direcly as the tangent of blade pitch angle, and pressures as the square root thereof $$P = \frac{P_0}{\sqrt{Q_0}}\sqrt{Q_m} \qquad (46)$$

To correlate this with the volume-pressure curves characteristic of the ducts and secure a conveniently workable formula for determining duct shape, we should have a simpler expression for duct pressure than that given by Equations 26 to 29. A study of the shape of the duct pressure curves of Figures 13, 14, and 19 indicates that when there is no net reduction of cross-sectional area from duct intake to exhaust ($i=e$), and also for static condition ($V=0$) regardless of duct shape, the duct pressure curve is in the form of a parabola symmetrical about a vertical axis and having its nose located at the origin for $V=0$, but located at a negative pressure and positive volume for other flight conditions. As soon as any contraction of the duct is introduced ($e<i$) a new portion of the curve appears in the form of a line which constitutes an almost exactly straight chord across the parabola. The height of this chord, and also its slope, increase with velocity, and with the amount of contraction. The duct curves for 200 miles per hour in Figures 13 and 19 each show this chord portion, located low and almost horizontally, as the left hand portion of the curve, and the parabolic portion as a very steeply rising portion at the right. The duct curves for 500 miles per hour, with the exception of curve 188 and a portion of curve 194, Figure 13, show only the chord portion within the working range. Obviously the parabolic portions are not of a shape that will permit coincidence with the locus of the pressure-volume points corresponding to maximum propeller efficiencies (curve 359, Figure 19) except at a point of cross over, and efficiencies will fall off rather rapidly each side of such point. This fact explains why the 200 mile per hour thrust-horsepower curves of Figures 16 and 20 show only a limited zone of high efficiency, as represented by the upward rise of the curves near 3000 horsepower in Figure 16 and near 8000 horsepower in Figure 20.

The chord portions of the duct curves are of such configuration, however, that considerable lengths thereof may lie close enough to the locus of maximum efficiencies (as represented for instance by curve 377 relative to curve 359, Figure 20) that efficiencies very close to maximum may be realized over most or all of the working range at the particular speed represented by the curve. Even in this case a duct curve (such as curve 377) can only be brought into exact coincidence with the locus of maximum efficiencies (such as curve 359) at one particular point on the curve, but if the point of such coincidence be properly chosen relative to the entire range of working conditions the above mentioned result of high efficiencies over the entire range may be realized. The problem therefore resolves itself into obtaining a reasonably simple formula for the chord portion of a duct pressure curve and equating it to the formula for the locus of maximum efficiencies at a preferred portion of the working range.

From Figures 13, 14, and 19 it will be observed that the chord portion of all duct curves showing such portions will if projected back to the vertical axis ($Q_m=0$) intersect such axis at a point corresponding substantially to $$P = .000495\left(\frac{i}{e}-1\right)V^2 \qquad (47)$$

Furthermore it will be observed that in each instance the slope $$\frac{P}{Q_m}$$

is approximately $$\frac{P}{Q_m} = .0054\frac{V}{eA}\left(\frac{i}{e}-1\right) \qquad (48)$$

Therefore the equation for the chord portion of the duct curves may be expressed as $$P = .000495\left(\frac{i}{e}-1\right)V\left(V+\frac{11Q_m}{eA}\right) \qquad (49)$$

or substituting $$A = \frac{\pi D^2}{4} \qquad (50)$$

$$P = .000495\left(\frac{i}{e}-1\right)V\left(V+\frac{14Q_m}{eD^2}\right) \qquad (51)$$

Before equating this to the value of P given by Equation 46 we should generalize that equation for propellers of different diameters, so that if $P_0$ and $Q_0$ have been determined for any given type of propeller or scale model thereof, the test results can be directly utilized for use of any propeller of similar design and proportions. Assuming a constant tip speed, pressure is independent of diameter but volume varies as the square of diameter. Therefore substituting $$\frac{D^2}{D_0^2}Q_0$$

in place of $Q_0$ in Equation 46 we have $$P = \frac{P_0 D_0 \sqrt{Q_m}}{\sqrt{Q_0} D} \qquad (52)$$

in which $D_0$ = diameter in feet of propeller used for establishing $P_0$ and $Q_0$.

Equating this value of P to that given by Equation 51 and solving for $i/e$ we have $$\frac{i}{e} = 1 + \frac{2020 P_0 D_0 \sqrt{Q_m}}{DV\left(V + \frac{14Q_m}{eD^2}\right)\sqrt{Q_0}} \qquad (53)$$

Since in general we will know in advance the horsepower, rather than the volume of air handled, let $H$ = actual horsepower.
Then combining Equations 42 and 52 we have $$H = 0.1572 \frac{P_0 D_0 Q_m^{3/2}}{Q_0^{1/2} E D} \qquad (54)$$

Solving this for $Q_m$ $$Q_m = 3.433 \frac{Q_0^{1/3} H^{2/3} E^{2/3} D^{2/3}}{P_0^{2/3} D_0^{2/3}} \qquad (55)$$

Substituting this value in Equation 53 and solving for $i$ $$i = e + \frac{3743 P_0^{1/3} D_0^{1/3} H^{1/3} E^{1/3} D^{2/3} e^2}{P_0^{2/3} D_0^{2/3} Q_0^{1/3} V^2 D^{1/3} e + 48.06 Q_0^{2/3} V H^{2/3} E^{2/3}} \qquad (56)$$

In order to take into account the effect of altitude

Let $a$ = density ratio at altitude
= ratio of standard density at altitude to standard density at sea level.

Then the effect of moving out on altitude scale 390 of Figure 20 to the desired altitude can be secured by substituting $$\frac{H}{a}$$

in the above equation in place of $H$, which gives $$i = e + \frac{3743 P_0^{1/3} D_0^{1/3} H^{1/3} E^{1/3} a^{1/3} D^{2/3} e^2}{P_0^{2/3} D_0^{2/3} Q_0^{1/3} V^2 a^{2/3} D^{1/3} e + 48.06 Q_0^{2/3} V H^{2/3} E^{2/3}} \qquad (57)$$

By determining the pressure, volume, and efficiency of the proposed propeller or of any similar propeller not necessarily of the same diameter, when turning at the tip speed intended for cruising and operating at maximum efficiency with 18.5° blade pitch, which values can be determined by a static test of a similar propeller exclusive of the particular duct system in which it may be employed, and substituting these values for $P_0$, $Q_0$, and $E$, respectively, in the above formula, together with the diameter $D_0$ of the test propeller, and substituting for $H$ the cruising horsepower it is intended to apply, for $D$ the diameter of the propeller it is intended to employ, for $V$ the speed at which it is desired to have maximum mechanical efficiency of the propulsion unit occur, and for $a$ the density ratio corresponding to the altitude at which it is desired maximum efficiency shall occur, Equation 57 resolves itself into an equation relating $i$ to $e$, thus determining for any desired value of either the value the other must have to provide the proper amount of duct contraction to secure maximum efficiency under the desired flight conditions.

Under certain circumstances it may be desirable to estimate the duct proportions required to secure certain results without the necessity of first running a pressure-volume test to determine the specific values of $P_0$ and $Q_0$ to employ in Equation 57 above. Good practice will fix the tip speed to be employed within relatively narrow limits, and the value of maximum efficiency $E$ that may be expected is rather closely known. The values of $P_0$ and $Q_0$ will, however, vary widely with the solidity of the propeller. However, introducing the solidity ratio as a variable, the performance curves of present day axial flow fans, may be drawn on to determine typical constants for a formula which then will not include as variables any typical test values.

In the best of modern axial flow fans maximum efficiency seems to vary from 88% to 91%. Since the specific values employed in the accompanying charts were based on a maximum efficiency of approximately 88%, let us assume $$E = 0.88 \qquad (58)$$

The product $nD$ is a convenient index of tip speed. In the first and second embodiments $nD = 200$, while in the third embodiment $nD = 250$.
Assume that as a fair average value for most well designed units $$nD = 225 \qquad (59)$$

For the third embodiment, the $P_0$ and $Q_0$ values would apply for point 397, the point of maximum efficiency on curve 352. Correcting these values to correspond to the above value of $nD$ $$P_0 = 8.76 \qquad (60)$$
$$Q_0 = 583 \qquad (61)$$

For this embodiment $$D_0 = 10 \qquad (62)$$

Let $S$ = solidity ratio of net propeller area, that is the projected area ratio of that portion of the propeller lying outside the solid hub.
For the third embodiment design $$S = 0.276 \qquad (63)$$

Assuming that the volume of air handled is independent of the solidity, but that the pressure varies directly as the net solidity, the value of $Q_0$ given in Equation 61 will apply for any solidity but the value of $P_0$ for propellers generally similar to the third embodiment but having different solidity may be expressed as follows:

$$P_0 = 8.76 \frac{S}{0.276} = 31.74 S \qquad (64)$$

Inserting values from Equations 58, 61, 62, and 64 in Equation 57 gives $$i = e + \frac{19970 H^{1/3} a^{1/3} D^{2/3} S^{1/3} e^2}{V^2 a^{2/3} D^{1/3} S^{2/3} e + 7.926 V H^{2/3}} \qquad (65)$$

or with negligible error the coefficients in this formula may be rounded out, as follows:

$$i = e + \frac{20000 H^{1/3} a^{1/3} D^{2/3} S^{1/3} e^2}{V^2 a^{2/3} D^{1/3} S^{2/3} e + 8 V H^{2/3}} \qquad (66)$$

By inserting in Equation 66 the diameter and net solidity ratio of the propeller to be employed, the horsepower of the engine and the density ratio at chosen cruising altitude, and the corresponding velocity at which maximum efficiency is desired, we have an equation between $i$ and $e$, thereby establishing the necessary relationship between the duct intake and exhaust areas to secure maximum efficiency at the particular craft speed and altitude selected. Either $i$ or $e$ may be chosen at will (that is the ratio of either the duct intake or exhaust area to propeller disc area) and the other is immediately fixed by Equation 66 for the particular conditions and dimensions selected. It may prove desirable in some instances to so arrange it that the maximum efficiency as above determined occurs exactly at the normal cruising conditions, while in other instances it may prove desirable to have the maximum efficiency occur for slightly different conditions in order to secure particular benefits at conditions other than normal cruising or better average efficiencies over a certain range of flight conditions, and this may prove to be possible with only very slight sacrifice of efficiencies at normal cruising speed and altitude.

The altitude factor $a$ enters into Equations 65 and 66 in such a manner as to have less final effect on the value of $i$ within the usual range of values of the other variables. An embodiment of my invention may therefore be based on a formula in which $a$ is a constant by substituting for $a$ its value at an altitude arbitrarily chosen at or below half the maximum of the altitudes at which my propulsion unit is apt to be employed, say 20,000 feet. At this altitude $a=0.533$. Substituting this value in Equation 66 and simplifying the coefficients, we have $$i = e + \frac{24{,}600 H^{1/3} d^{2/3} S^{4/3} e^2}{V^2 D^{4/3} S^{2/3} e + 12 V H^{2/3}} \quad (66a)$$

Similarly a fixed value for V may be chosen, but for reasons previously discussed it must be chosen well up toward the maximum speed at which the unit is to be operated, say 400 miles per hour. Substituting this value in Equation 66a, and simplifying the coefficients, we have $$i = e + \frac{15.4 H^{1/3} D^{2/3} S^{4/3} e^2}{100 D^{4/3} S^{2/3} e + 3 H^{2/3}} \quad (66b)$$

For the ordinary range of values of the variables involved Equation 66a gives results within one per cent of those given by Equation 66 and therefore propulsion units having ducts proportioned substantially in accordance with this equation will give excellent performance at the speed V for which designed and reasonably good performance at lower speeds and at slightly higher speeds. Similarly propulsion units designed substantially in accordance with Equation 66b will give excellent performance at the preferred speed of 400 miles per hour and reasonably good performance at all lower speeds and at slightly higher speeds. Relatively slight departures from the duct proportions indicated by these equations will involve relatively great sacrifice in performance at the higher speeds, as was previously indicated in connection with the change from shape 385 to shape 385a in Figure 17.

By inserting in either Equation 57 or Equation 66 the values pertaining to the propeller dimensions and flight conditions for which each of the embodiments previously described was designed it will be found that the duct dimensions which were actually employed in those embodiments correspond very closely to the dimensions which these formulas would indicate to be ideal. It will be observed that of all the ducts that were found to give good performance at high speed and high altitude the ratio $e/i$ lies somewhere in the range of values from 0.833 to 0.920. From these instances and from the insertion of typical values in Equations 57 and 66 it can be ascertained that for high speed and high altitude performance the ratio $e/i$ should generally be intermediate between 0.800 and 0.950, but to best meet any given set of flight conditions the equations will indicate preferable values within this range.

As a convenient criterion for choosing the proper net solidity of propeller, particularly in those instances where static thrust conditions are critical, Equation 43 may be rewritten for the conditions which pertain when the blades are set to 18.5° pitch, as follows:

$$P_0 = \left(\frac{16.65 E_0}{T_0/H_0}\right)^2 \quad (67)$$

in which $T_0$ = static thrust in pounds with 18.5° blade pitch.
$H_0$ = corresponding horsepower.
$E_0$ = corresponding mechanical efficiency of propeller as an air moving unit.

Equating this to the value of $P_0$ given by Equation 64, we have $$S = 8.732 \left(\frac{H_0 E_0}{T_0}\right)^2 \quad (68)$$

From this equation the solidity necessary to secure any desired static thrust per horsepower at 18.5° blade pitch can be determined, while Equation 45 can be used to determine the exhaust area $(eA_d)$ required to produce any given static thrust (T) at this same thrust per horsepower.

For this purpose Equation 45 may be rewritten as $$eA_d = T_0 \left(\frac{T_0}{H_0}\right)^2 \frac{1 + \sqrt{e/i}}{2874 E_0^2} \quad (69)$$

Since the mechanical efficiency $(E_0)$ pertaining under these particular circumstances may not be known when these selections are being made, a close approximation may be secured by assigning to $E_0$ an arbitrary value within the average range of values it is likely to have under such circumstances, say:

$$E_0 = 0.85 \quad (70)$$

Then Equation 68 may be rewritten as $$S = 6.3 \left(\frac{H_0}{T_0}\right)^2 \quad (71)$$

and Equation 69 may be rewritten as $$eA_d = T_0 \left(\frac{T_0}{H_0}\right)^2 \frac{1 + \sqrt{e/i}}{2080} \quad (72)$$

Alternatively Equations 71 and 72 may be combined to give a direct relation between solidity, static thrust, and duct exhaust area, as follows:

$$S = \frac{T_0 (1 + \sqrt{e/i})}{330 e A_d} \quad (73)$$

which same formula holds regardless of the mechanical efficiency. If this formula is used the corresponding thrust per horsepower may be determined either from Equation 44 or from Equation 68 or 71. Therefore, whether the solidity ratio (S) and the duct exhaust area $(eA_d)$ are determined from Equations 71 and 72 or from Equation 73 the corresponding static thrust per horsepower can always be ascertained, and the solidity ratio and duct exhaust area may be so chosen with relation to each other as to provide the desired static thrust at a favorable thrust per horsepower, for instance at a value in excess of four pounds thrust per horsepower.

Equation 73 may be further simplified to express propeller solidity in terms of duct proportions alone by inserting into that equation a suitable value of thrust per square foot of duct outlet area. The thrust $T_0$ referred to in the equation is the static thrust effective when the propeller blades are set to 18½° pitch. From curves 370 and 380 of Figure 20 it is observed that the static thrusts at 18½° pitch divided by the outlet areas of the respective ducts gives thrusts per square foot of 64.9 and 63.2, respectively. These conditions apply for the point 397 of Figure 19 for which the efficiency reaches the peak of the efficiency curve 357, and it will be apparent from that curve that conditions cannot depart very far therefrom without serious decrease in the efficiency with which static thrust can be produced. As previously mentioned, however, Figure 20 is based on a value of $nD=250$ while Equation 73 is based on $nD=225$. Converting the average thrust of 64 pounds per square foot of outlet area obtained from Figure 20 to the conditions of Equation 73 by multiplying by $(225/250)^2$ gives $$\frac{T_0}{eA_d}=51.8 \text{ pounds per square foot} \quad (73a)$$

Inserting this value in Equation 73 gives $$S=0.157(1+\sqrt{e/i}) \quad (73b)$$

This constitutes a simple expression for determining the proper solidity of propeller to give good performance, and especially good static thrust, when operated in a duct having any chosen exhaust to inlet area ratio $e/i$.

*Air flow and pressure conditions within duct*

In order that the air flow and pressure conditions pertaining under various circumstances may be better visualized and more fully understood a tabulated summary of these conditions is given below for each of several operating conditions typical of those discussed hereinbefore and charted in Figures 13 to 18, inclusive. All these apply to a six foot diameter propeller turning at 2000 R. P. M. as employed in the illustrations of the first and second embodiments. In order not to unduly multiply the number of such tabulations only four are given, all taken with the propeller blades set at 45 degree pitch and corresponding respectively to the conditions covered by the four curves 228, 225, 235, and 245 of Figure 16, the tabulations corresponding specifically to the conditions represented by points A, B, C, and D respectively in that figure, and as similarly identified in Figure 13.

In each tabulation the conditions are summarized for each of the following six stations:

Station 1: far enough upstream from propulsion unit so that air is undisturbed thereby.
Station 2: at intake.
Station 3: immediately upstream from propeller.
Station 4: immediately downstream from propeller.
Station 5: at outlet.
Station 6: downstream from propulsion unit at point where air attains its terminal velocity.

*Case A.*—Duct ratios: $i=1.00$; $a=0.75$; $e=2.00$. Craft velocity=0. Total pressure imparted by propeller, $P=33.9$ inches of water. Volume of air flow, $Q_m=543$ thousand cubic feet per minute.

| Station | 1 | 2 | 3 | 4 | 5 | 6 |
|---|---|---|---|---|---|---|
| Cross-sectional area, square feet, A | | 28.27 | 21.20 | 21.20 | 56.54 | |
| Air velocity, M. P. H., relative to craft, $v$ | 0 | 218.19 | 290.97 | 290.97 | 109.09 | 262.27 |
| Velocity head, inches of water, $P_v$ | 0 | 23.46 | 41.73 | 41.73 | 5.87 | 33.90 |
| Static pressure, inches of water, $P_s$ | 0 | −23.46 | −41.73 | −7.83 | 28.03 | 0 |
| Total pressure, inches of water, $P_t$ | 0 | 0 | 0 | 33.90 | 33.90 | 33.90 |

*Case B.*—Duct ratios: $i=1.00$; $a=0.75$; $e=0.85$. Craft velocity=0. Total pressure imparted by propeller, $P=49.2$ inches of water. Volume of air flow, $Q_m=346$ thousand cubic feet per minute.

| Station | 1 | 2 | 3 | 4 | 5 | 6 |
|---|---|---|---|---|---|---|
| Cross-sectional area, square feet, A | | 28.27 | 21.20 | 21.20 | 24.03 | |
| Air velocity, M. P. H., relative to craft, $v$ | 0 | 139.03 | 185.40 | 185.40 | 163.57 | 315.95 |
| Velocity head, inches of water, $P_v$ | 0 | 9.53 | 16.94 | 16.94 | 13.19 | 49.20 |
| Static pressure, inches of water, $P_s$ | 0 | −9.53 | −16.94 | 32.26 | 36.01 | 0 |
| Total pressure, inches of water, $P_t$ | 0 | 0 | 0 | 49.20 | 49.20 | 49.20 |

*Case C.*—Duct ratios: $i=1.00$; $a=0.75$; $e=0.85$. Craft velocity=200 miles per hour. Total pressure imparted by propeller, $P=27.4$ inches of water. Volume of air flow, $Q_m=580$ thousand cubic feet per minute.

| Station | 1 | 2 | 3 | 4 | 5 | 6 |
|---|---|---|---|---|---|---|
| Cross-sectional area, square feet, A | | 28.27 | 21.20 | 21.20 | 24.03 | |
| Air velocity, M. P. H., relative to craft, $v$ | 200 | 233.06 | 310.79 | 310.79 | 274.19 | 309.20 |
| Velocity head, inches of water, $P_v$ | 19.71 | 26.77 | 47.60 | 47.60 | 37.05 | 47.11 |
| Static pressure, inches of water, $P_s$ | 0 | −7.06 | −27.89 | −0.49 | 10.06 | 0 |
| Total pressure, inches of water, $P_t$ | 19.71 | 19.71 | 19.71 | 47.11 | 47.11 | 47.11 |

*Case D.*—Duct ratios: $i=1.00$; $a=0.75$; $e=0.85$. Craft velocity=500 miles per hour. Total pressure imparted by propeller, $P=32.6$ inches of water. Volume of air flow, $Q_m=551$ thousand cubic feet per minute.

| Station | 1 | 2 | 3 | 4 | 5 | 6 |
|---|---|---|---|---|---|---|
| Cross-sectional area, square feet, A | | 28.27 | 21.20 | 21.20 | 24.03 | |
| Air velocity, M. P. H., relative to craft, $v$ | 500 | 221.41 | 295.25 | 295.25 | 260.48 | 562.27 |
| Velocity head, inches of water, $P_v$ | 123.21 | 24.16 | 42.96 | 42.96 | 33.44 | 155.81 |
| Static pressure, inches of water, $P_s$ | 0 | 99.05 | 80.25 | 112.85 | 122.37 | 0 |
| Total pressure, inches of water, $P_t$ | 123.21 | 123.21 | 123.21 | 155.81 | 155.81 | 155.81 |

In each of the above tabulations P and $Q_m$ are determined from Figure 13. The areas are fixed by the propeller diameter and duct ratios. These and $Q_m$ give the velocities, except at stations 1 and 6, in accordance with Equation 9. The velocity at station 1 is, in each instance, the craft velocity, and that at station 6 the terminal velocity, $V_t$, as previously determined in accordance with Equation 25 as an incident to calculation of thrust. Whether the exact volume of air passing through the duct actually acquires this precise velocity, or whether after leaving the duct it entrains more air and the entire augmented mass acquires an equivalent velocity is not of importance so long as the air actually leaves the propulsion unit with a combination of static and velocity heads sufficient to impart to it the terminal velocity if all converted into velocity head.

The velocity head corresponding to each velocity is determined in accordance with Equation 10, from which the total pressure at stations 1 and 6 are immediately determined, which pressures apply to all other stations on the same side of the propeller. The static pressures can then be determined as the differences between the total pressures and the velocity heads. The difference between the total pressure at station 4 and that at station 3 should equal the pressure, P, imparted by the propeller, and the same should be true of the static pressures, and it will be observed that this is the case.

A simple analysis of the above tabulations will give a good idea of the manner in which thrust is produced in each of the above instances.

Let numerical subscripts indicate station numbers in the above tabulations.

For instance: $A_3$=area at station 3.
$P_{s23}$=average effective static pressure between station 2 and station 3.

Let $T_p$=thrust contributed directly by pressure difference on the propeller,
$T_i$=thrust contributed by static pressure on the intake duct,
$T_e$=thrust contributed by pressure on exhaust duct.

Then
$$T_p = 5.2 A_3 P \quad (74)$$
$$T_i = 5.2(A_3 - A_2) P_{s23} \quad (75)$$
$$T_e = 5.2(A_5 - A_4) P_{s45} \quad (76)$$

If the static pressures to be averaged do not differ greatly the average may be approximated as the arithmetical mean of the static pressures at the two ends, but if they differ much the value thus arrived at will be much too low because the static pressures instead of bearing a straight line relationship to area vary as the complements of the squares of the reciprocals of the areas. The exact average could be arrived at by integrating, as was done in the original derivation of Equation 20, but as a rough approximation more for the purpose of tracing the effects of the tabulated values than for the numerical values of the results obtained we will Let
$$P_{s23} = \frac{P_{s2} + P_{s3}}{2} \quad (77)$$

and
$$P_{s45} = \frac{P_{s4} + P_{s5}}{2} \quad (78)$$

Then
$$T = T_p + T_i + T_e$$
$$= 5.2 \left[ A_3 P + (A_3 - A_2)\frac{P_{s2}+P_{s3}}{2} + (A_5 - A_4)\frac{P_{s4}+P_{s5}}{2} \right] \quad (79)$$

Applying this formula to the above four cases.

Case A: $T = 5.2 \Bigl[ 21.20 \times 33.9 + (-7.07)$
$$\frac{-23.46 - 41.73}{2} + 35.34 \frac{-7.83 + 28.03}{2} \Bigr]$$
$= 5.2 \ (718.7 + 230.4 + 355.9)$
$= 3737 + 1198 + 1851 = 6786$ pounds Calculation of more accurate average static pressures, by integration or estimation for intermediate areas will so greatly increase the last term and slightly alter the second term as to change this calculated value to agree with the 8277 pounds thrust which the method of calculation originally outlined gives for this case.

Case B: $T = 5.2 \Bigl[ 21.20 \times 49.2 + (-7.07)$
$$\frac{-9.53 - 16.94}{2} + 2.83 \frac{32.26 + 36.01}{2} \Bigr]$$
$= 5.2 \ (1043.0 + 93.6 + 96.6)$
$= 5424 + 487 + 502 = 6413$ pounds which closely approximates the value of 6354 pounds, calculated by the method previously outlined, and with use of a true average pressure value would exactly equal it.

Case C: $T = 5.2 \Bigl[ 21.20 \times 27.4 + (-7.07)$
$$\frac{-7.06 - 27.89}{2} + 2.83 \frac{-0.49 + 10.06}{2} \Bigr]$$
$= 5.2 \ (580.9 + 123.5 + 13.5)$
$= 3021 + 642 + 70 = 3733$ pounds which similarly closely approximates the calculated value of 3681 pounds.

Case D: $T = 5.2 \Bigl[ 21.20 \times 32.6 + (-7.07)$
$$\frac{99.05 + 80.25}{2} + 2.83 \frac{112.85 + 122.37}{2} \Bigr]$$
$= 5.2 \ (691.1 - 638.8 + 332.8)$
$= 3594 - 3296 + 1731 = 2029$ pounds which also closely approximates the calculated value of 1994 pounds.

In each of the four cases above it will be noted that the final estimate of thrust is arrived at by adding (or subtracting) three values. In each instance the first of these three values is the estimate of thrust due to pressure difference on the propeller disc, the second that due to pressures on the inside of the intake duct, and the third that due to pressures on the inside of the exhaust duct. It will be noted that both duct pressures are additive to propeller thrust in all but the last of the above four cases. This is because negative static pressures exist in the intake duct and positive pressures in the exhaust duct. Case D, however, indicates that when the speed becomes as high as 500 miles per hour positive static pressures exist in all ducts, with the result that the intake duct gives rise to a negative thrust, almost large enough to cancel the positive thrust of the propeller, and more than enough to cancel the positive thrust contributed by the exhaust duct. The large opposite effects of these intake and exhaust duct pressures explains the peculiar distribution and spread of the pressure curves in Figure 14.

The tabulation in case D indicates that the air velocity through the propeller is 295.25 miles per hour. Since the rotational tip velocity is 428.4 miles per hour the resultant air speed relative to the blade tips is approximately 520 miles per hour or substantially the same as the craft speed of 500 miles. At lower craft speeds this air tip speed bears a higher ratio to craft speed while at higher craft speeds it becomes less than craft speed.

*Comparison with conventional propeller*

(a) FIRST AND SECOND EMBODIMENTS

In the lower left portion of Figure 16 there is plotted against corresponding horsepower the thrust obtainable from a conventional propeller of the same diameter and rotational speed as that assumed herein for all the numerical illustrations of the first and second embodiments of my new propulsion unit, namely six foot diameter and 2000 R. P. M. This has been computed from data furnished by the National Advisory Committee for Aeronautics in their Report No. 642, using specifically the three bladed, adjustable pitch propeller therein identified as "propeller 6101 with liquid-cooled engine nacelle." Since the data in that report does not include pitch settings above 45 degrees, no greater pitch settings are included in the figure. It will also be noted that no speeds in excess of 300 miles per hour are included. This is because at 45° pitch the thrust falls off to zero at 342 miles per hour and actually becomes negative at slightly higher speeds.

As a specific example of the comparisons which may be made between my propulsion unit and the conventional propeller, point 256 (Figure 16) indicates that at 200 miles per hour, the conventional propeller with 45 degree pitch can only produce 452 pounds thrust, and will require 362 horsepower. Point C indicates that at the same speed and pitch my propulsion unit will produce 3681 pounds thrust at 2940 horsepower, or approximately eight times the thrust at the same thrust per horsepower. To be sure increased diameter or increased rotational speed would bring up the thrust and horsepower values of the conventional propeller, but corresponding increases in rotational speed and diameter would bring up the thrust and horsepower values of my propulsion unit in approximately the same proportion, and therefore the comparison would not be particularly altered. Therefore limiting tip speeds will confine the greatest possible output of the conventional propeller to a small fraction of that of my propulsion unit.

(b) THIRD EMBODIMENT

As previously indicated the third embodiment was primarily designed to give better static thrusts per horsepower than the first two embodiments at sacrifice of the thrust per square foot of propeller disc area, utilizing a solidity ratio not as far above present practice as in the case of the first two embodiments. As would be expected therefore the thrusts do not exceed those of a conventional propeller of the same diameter and speed by as large a ratio as in the case of the first two embodiments. Even so the increase is very marked, however.

In Figure 20 curves 400 and 401 plot the thrust versus horsepower for N. A. C. A. propeller #6101 for static conditions and 200 miles per hour craft velocity respectively, assuming the propeller to be 10 feet in diameter and turning at 1500 R. P. M. corresponding to the third embodiment propulsion unit to which the remaining performance curves of Figure 20 apply. Also included in the same figure, as a further indication of present propeller practice are two points 402 and 403, the point 402 indicating the static thrust and horsepower developed by one propeller of a modern interceptor airplane in which the diameter is almost twelve feet, while point 403 indicates the similar values for a modern cargo airplane equipped with fifteen foot propellers. The relationship of curves 370 and 380 to these points indicates that it would require about a fourteen foot diameter in propellers of the type at present employed to give static thrust values comparable to those developed by a ten foot diameter propulsion unit of my proposed type.

Comparison of the static thrust curves 370 and 380 for my unit with the static thrust curve 400 for the corresponding present propeller indicates how much better thrusts my unit gives at corresponding horsepowers, and especially how much better at the same thrust per horsepower. For instance at three pounds thrust per horsepower, as determined by the points of intersection with the diagonal line labeled "3 pounds thrust per H. P." my unit gives about four times the static thrust of present propellers. At four pounds thrust per horsepower (corresponding approximately to present practice as indicated by points 402 and 403) my unit gives about three times the thrust of present propellers.

Instead of utilizing the advantages of my invention to secure greater static thrusts at comparable thrusts per horsepower as above outlined, the unit may be employed to secure comparable thrusts at much better thrusts per horsepower. For instance if the propeller of curve 400 has 525 horsepower applied to it 2100 pounds thrust is secured, corresponding to the four pounds thrust per horsepower of present practice, but my propulsion unit, as indicated by curves 370 and 380, will supply this thrust with the application of some 360 horsepower, showing an improvement of almost fifty percent in the thrust per horsepower.

As previously indicated the particular arrangement illustrated in the third embodiment does not give high efficiencies at 200 miles per hour until the blade pitch is increased to about 45°. Recent experience with axial flow fans would indicate the possibility of so widening out the high efficiency zone as to considerably raise thrust curves 371 and 381 in the vicinity of 1000 to 2000 horsepower, without sacrifice elsewhere, but regardless of this possibility comparison of the upward loop of curve 401 near the 700 horsepower line with the similar loop of curves 371 and 381 near the 7000 horsepower line indicates that at this speed the maximum thrusts obtainable from corresponding diameters are ten times as large with my unit as with present propellers. If the duct proportions had been chosen to secure maximum efficiency at 200 miles per hour instead of at 500 miles per hour as was done in designing this unit, more uniformly excellent efficiencies along the major portion of the 200 mile per hour thrust curve could have been secured, as is now the case with the 500 mile per hour curve 382.

No 500 mile per hour curve is shown for N. A. C. A. propeller #6101 for the reason that when the craft speed reaches 429 miles per hour at 45° blade pitch, which is the steepest pitch for which N. A. C. A. furnishes data, the thrust becomes zero for a ten foot propeller operating at 1500 R. P. M., and it of course falls below usable values at considerably lower speeds, while my unit as outlined in this embodiment and charted in curve 382 gives its best performance at all altitudes at approximately 500 miles per hour.

From inspection of the curves of Figure 20 it will be apparent that my unit, powered with a 1000 horsepower motor supercharged to retain power at altitude, will give twice the static thrust of a corresponding present propeller similarly powered, at distinctly better thrust per horsepower, and in flight will give its best performance at 40,000 to 65,000 foot altitudes, while if powered with a 2000 horsepower motor the static thrust will be almost three times that of a present propeller and the best performance at 20,000 to 50,000 foot altitudes, with high efficiency at all altitudes at speeds far in excess of those at which present propellers can continue to produce any useful thrust.

I claim:

1. A thrust producing unit comprising a duct having an inlet and an outlet, the area of the outlet bearing to the area of the inlet the ratio $e/i$, in combination with an airscrew the area of which projected onto a plane perpendicular to the air-screw axis, exclusive of the area of hub which is not open to airflow, constitutes a percentage of the total swept disc area of the airscrew, exclusive of the same hub area, which percentage is substantially equal to 15.7 per cent plus 15.7 per cent of the square root of the ratio $e/i$.

2. In aircraft, thrust producing means comprising an airscrew and an engine capable of delivering a sustained horsepower, H, to said airscrew in combination with a duct surrounding said airscrew and proportioned substantially in accordance with the formula $$i = e + \frac{15.4 H^{1/3} D^{2/3} S^{1/3} e^2}{100 D^{4/3} S^{2/3} e + 3 H^{2/3}}$$

in which:

$i$ = the ratio of the net area of duct inlet to the gross disc area swept by the airscrew,
$e$ = the ratio of the net area of duct outlet to the gross disc area swept by the airscrew,
$D$ = diameter of airscrew, in feet,
$S$ = solidity ratio of net airscrew area; that is the ratio that the area of the projection of the airscrew onto a plane perpendicular to the airscrew axis minus the hub area which constitutes that portion of the swept disc area not available for airflow bears to the gross swept disc area of the airscrew minus the same hub area.

3. In a craft adapted to move through the air at a sustained speed of V miles per hour, thrust producing means comprising an airscrew and an engine capable of delivering a sustained horsepower, H, to said airscrew in combination with a duct surrounding said airscrew and proportioned substantially in accordance with the formula $$i = e + \frac{24,600 H^{1/3} D^{2/3} S^{1/3} e^2}{V^2 D^{4/3} S^{2/3} e + 12 V H^{2/3}}$$

in which:

$i$ = the ratio of the net area of duct inlet to the gross disc area swept by the airscrew,
$e$ = the ratio of the net area of duct outlet to the gross disc area swept by the airscrew,
$D$ = diameter of airscrew, in feet,
$S$ = solidity ratio of net airscrew area; that is the ratio that the area of the projection of the airscrew onto a plane perpendicular to the airscrew axis minus the hub area which constitutes that portion of the swept disc area not available for airflow bears to the gross swept disc area of the airscrew minus the same hub area.

4. In an aircraft adapted to move through the air at a sustained speed of V miles per hour at an altitude at which the standard air density bears the ratio $a$ to standard density at sea level, thrust producing means comprising an airscrew and an engine capable of delivering a sustained horsepower, H, to said airscrew in combination with a duct surrounding said airscrew and proportioned substantially in accordance with the formula $$i = e + \frac{20,000 H^{1/3} a^{1/3} D^{2/3} S^{1/3} e^2}{V^2 a^{2/3} D^{4/3} S^{2/3} e + 8 V H^{2/3}}$$

in which:

$i$ = the ratio of the net area of duct inlet to the gross disc area swept by the airscrew,
$e$ = the ratio of the net area of duct outlet to the gross disc area swept by the airscrew,
$D$ = diameter of airscrew, in feet,
$S$ = solidity ratio of net airscrew area; that is the ratio that the area of the projection of the airscrew onto a plane perpendicular to the airscrew axis minus the hub area which constitutes that portion of the swept disc area not available for airflow bears to the gross swept disc area of the airscrew minus the same hub area.

HAROLD T. AVERY.

REFERENCES CITED

The following references are of record in the file of this patent:

UNITED STATES PATENTS

| Number | Name | Date |
| --- | --- | --- |
| 389,330 | Smith | Sept. 11, 1888 |
| 803,671 | Curtis | Nov. 7, 1905 |
| 1,332,475 | Spitler | Mar. 2, 1920 |
| 1,454,967 | Gill | May 15, 1923 |
| 1,714,917 | Martin | May 28, 1929 |
| 1,802,861 | Zwinkel | Apr. 28, 1931 |
| 1,838,674 | Heath | Dec. 29, 1931 |
| 1,867,809 | Chase | July 19, 1932 |
| 1,873,505 | Stipa | Aug. 23, 1932 |
| 1,978,809 | Moody | Oct. 30, 1934 |
| 1,993,701 | Avery | Mar. 5, 1934 |
| 2,006,805 | Gwinn | July 2, 1934 |
| 2,030,375 | Kort | Feb. 11, 1936 |
| 2,111,318 | Droz | Mar. 15, 1938 |
| 2,152,171 | Avery | Mar. 28, 1939 |
| 2,164,000 | Keller | June 27, 1939 |
| 2,208,602 | Ruths et al. | July 23, 1940 |
| 2,219,499 | Troller | Oct. 29, 1940 |
| 2,280,654 | Mader | Apr. 21, 1942 |
| 2,316,940 | Dewey et al. | Apr. 20, 1943 |
| 2,475,022 | Gregg | July 5, 1949 |

FOREIGN PATENTS

| Number | Country | Date |
| --- | --- | --- |
| 1,330 | Great Britain | Apr. 3, 1879 |
| 177,047 | Great Britain | Mar. 23, 1922 |
| 405,469 | Great Britain | Feb. 8, 1934 |